United States Patent [19]

Allison et al.

[11] Patent Number: 5,359,332
[45] Date of Patent: Oct. 25, 1994

[54] DETERMINATION OF PHASE AMBIGUITIES IN SATELLITE RANGES

[75] Inventors: Michael T. Allison, Santa Clara; Phillip Deaver, Cupertino; Scott Dreier, San Francisco, all of Calif.

[73] Assignee: Trimble Navigation Limited, Sunnyvale, Calif.

[21] Appl. No.: 999,099

[22] Filed: Dec. 31, 1992

[51] Int. Cl.⁵ .......................... G01S 5/02; G01S 3/02
[52] U.S. Cl. ..................................... 342/357; 342/457
[58] Field of Search ............... 342/352, 356, 357, 358, 342/457

[56] References Cited

U.S. PATENT DOCUMENTS

| | | | |
|---|---|---|---|
| 4,812,991 | 3/1989 | Hatch | 342/357 |
| 5,148,179 | 9/1992 | Allison | 342/357 |
| 5,252,982 | 12/1993 | Frei | 342/357 |

OTHER PUBLICATIONS

Hatch, "Instantaneous Ambiguity Resolution" Paper Presented at KIS Symposium 1990.

*Primary Examiner*—Gregory C. Issing
*Attorney, Agent, or Firm*—John Schipper

[57] ABSTRACT

A method for accurately determining the position of a roving receiver positioned on or above the Earth's surface, relative to the position of a reference receiver whose position is known with sufficient accuracy, using measurements of signal phase transmitted at one or more carrier frequencies and received from each of four or more satellites in a Satellite Positioning System (SPS). Phase double differences are formed, using the reference and roving receivers and any two satellites drawn from four or more satellites, using phase information obtained from either or both of the two carrier signal frequencies. Phase correction information, in the form of estimates of integer wavelength ambiguities, is then obtained from two sets of ambiguity estimates computed with the roving receiver antenna in each of two specified positions, with the reference receiver antenna lying between and being collinear with the two roving receiver-antenna positions. If the distance between the reference receiver antenna position and the two roving receiver antenna positions is sufficiently small, a set of estimates at only one of the roving receiver positions may suffice. If an azimuth angle measuring device is incorporated in the apparatus, a set of estimates at only one roving receiver position may again suffice. The method produces a set of simultaneous equations that can be solved for the coordinates of a roving receiver located at an arbitrary position. The reference receiver antenna is positioned at a fixed location and orientation while the roving antenna is correctly positioned at each of two specified locations and orientations. A Global Positioning System (GPS) or a Global Orbiting Navigational System (GLONASS) may serve as the SPS.

27 Claims, 8 Drawing Sheets

DETERMINATION OF PHASE AMBIGUITIES IN SATELLITE RANGES

FIELD OF THE INVENTION

This invention relates to the determination of relative position on or above the Earth's surface, using satellite communications for such determination, and the resolution of integer ambiguities in satellite range measurements used for such position determination.

BACKGROUND OF THE INVENTION

A Satellite Positioning System (SPS), such as the Global Positioning System (GPS) or the Global Orbiting Navigation Satellite System (GLONASS), uses transmission of coded radio signals from a plurality of Earth-orbiting satellites. A single passive receiver of such signals is capable of determining receiver absolute position in an Earth-centered, Earth-fixed coordinate reference system utilized by the SPS. A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual situation.

In differential positioning, many of the errors in the SPS that compromise the accuracy of absolute position determination are similar in magnitude at stations that are physically close. The effect of these errors on the accuracy of differential position determination is therefore substantially reduced by a process of partial error cancellation.

The Global Positioning System (GPS) satellites transmit spread-spectrum signals on the L1 frequency ($f_{L1}$=1575.42 MHz) and on the L2 frequency ($f_{L2}$=1227.6 MHz). The L1 signal is modulated by two pseudo-random noise (PRN) codes, known as the C/A-code (chip rate of 1.023 MHz) and the P-code (chip rate of 10.23 MHz). The L2 signal is modulated only by the P-code. Most GPS receivers generate replica PRN codes to facilitate coherent demodulation of the received GPS signals. Accepted methods for generating the C/A-code and P-code for designers of GPS receivers are discussed in "GPS Interface Control Document ICD-GPS-200", Rockwell International Corporation, Satellite Systems Division, Revision A, Sep. 26, 1984, which is incorporated by reference herein. The operators of the GPS satellites can substitute for the P-code an encrypted version of the P-code, called the Y-code. The Y-code would be transmitted on both the L1 and L2 frequencies.

In addition to transmitting the PRN codes, the GPS satellites also transmit navigation data at 50 baud. These data are ephemerides and almanac of the satellites and are used to calculate accurate satellites positions in an Earth-centered, Earth-fixed coordinate system. These positions are utilized by absolute and differential positioning methods.

The Global Orbiting Navigation Satellite System (GLONASS) satellites transmit spread spectrum signals on channelized L1 frequencies in the band 1597–1617 MHz, and on channelized L2 frequencies in the band 1240–1260 MHz. The choice of L1 and L2 signal frequency is satellite-dependent. The L1 signal is modulated by a C/A-code (chip rate of 511 kHz), and a P-code (chip rate of 5.11 MHz). The L2 signal is currently modulated only by the P-code The GLONASS satellites also transmit navigational data at 50 baud. The methods for receiving the GLONASS signals, and decoding data, are in general similar to those accepted methods for GPS signals.

Numerous applications require the determination of the relative position between stations. Geodetic survey applications can be subdivided into: (1) applications in which all of the stations receiving the satellite signals are stationary, referred to as static surveying; and (2) applications in which one or more of the stations is moving relative to other stations, referred to as kinematic surveying. The latter class of applications is increasingly popular, because many more relative station positions can be determined in a fixed time of observation of the satellites.

If the stations have a method of inter-station communication, the relative positions between stations can be computed in real-time. Satellite data need not be stored and post-processed after a survey mission in applications that require real-time relative position; only the final computed relative positions need to be stored. Techniques which compute relative positions in real-time have the advantage of being able to determine whether any station is experiencing difficulty in receiving the satellite signals—for example, due to equipment failure.

One or more stations is designated as a reference station, and can be fixed at a known position (or can be moving, which is less likely). The positions of the other stations, known as the roving stations, which also may be stationary or moving, are calculated relative to the reference station(s). The approximate absolute position of the reference stations are required. These positions, if not previously determined, can be computed using established absolute position determination methods that utilize measurement of PRN code phases.

The highest accuracy obtainable in differential positioning requires measurement and utilization of the received carrier phase of the L1 and/or L2 signals at precisely known times, derived from clocks within the GPS receivers. Some techniques for processing GPS data for kinematic surveying applications use only these carrier phase measurements in the calculation of differential positions, with measurement of PRN code phases only used to calculate accurate time-marks for the carrier phase measurements. However, other methods also use PRN code phase measurements together with carrier phase measurements in the calculation of differential positions. Such a method is described by Allison in U.S. Pat. No. 5,148,179. A major difficulty occurs if only the carrier phase measurements are utilized in the calculation of differential positions. These measurements are ambiguous. The measurement from each satellite includes the measurement of a fractional phase $\Phi(0° \leq \Phi < 360°)$ plus an additional integer number N of whole cycles of phase. This integer number or integer ambiguity, hereafter referred to as a phase integer, can not be directly measured by a receiver.

For kinematic surveying, a process known as integer initialization can be used to establish the initially unknown phase integers. One approach is to set the receivers at marks whose relative positions are already known with sufficient accuracy. These relative positions are also known as baselines, and are defined by (x,y,z) vector components. Another approach is to allow the receivers to remain static at arbitrary marks for a selected period of time, to allow static surveying techniques to be used to resolve the phase integers. This method is time consuming. Another approach is to exchange the antennas between receivers set at arbitrary marks which are close together, without disturbing the signal reception during the exchange of the antennas. In this approach, both antennas must be physically moved to different sites, which is a process requiring much care to prevent loss of signal reception.

The methods discussed thus far rely principally on carrier phase measurements to resolve the phase integers. Other methods use a combination of carder phase measurements and PRN code phase measurements to resolve the integers. Such a method is described by Allison in U.S. Pat. No. 5,148,179. Methods which use PRN code phase measurements suffer from problems caused by multi-path errors on the PRN code phase measurements. These problems are worse for techniques which employ only measurements from the L1 signal or the L2 signal and do not combine the L1 and L2 measurements to form useful linear combinations with modified effective signal wavelengths. To enable these methods which use PRN code phase to be used reliably in the presence of multi-path reflections, measurement averaging or filtering is necessary. The necessity for measurement averaging increases the time required to correctly resolve the phase integers.

Once the phase integers are resolved, differential positioning is possible with the full accuracy obtained by the carder phase measurements. However, if signal lock cannot be maintained on at least four satellites, the initialization procedure may need to be repeated.

Several workers have applied two spaced apart antennas for various purposes. U.S. Pat. No. 3,886,559, issued to Lanson et al, discloses two remotely controlled antennas that are caused to independently rotate about their respective axes by gear arrangements that are controlled elsewhere by an operator. Application of this apparatus to optimization of antenna direction for receipt of VHF and UHF television signals is discussed.

A communications duplexer that uses one antenna for receiving and a second antenna, spaced apart from the first antenna, for transmitting or receiving is disclosed by Etherington in U.S. Pat. No. 4,361,905. A radio transmitter and receiver is selectively coupled to one antenna for transmitting and to either of the two antennas for frequency diversity receiving. The antennas are not physically exchanged for receiving purposes.

Beier et al disclose a direction finding system using two GPS antennas in U.S. Pat. No. 4,719,469. First and second GPS signals are received by the first and second antennas, respectively, from a GPS satellite, and these signals are processed through first and second Costas loops, respectively. A phase difference is then determined from the output signals from the two Costas loops, using a phase meter, and the direction of the pointing angle of the two-antenna array to the satellite is determined from straightforward geometric arguments.

A direction finding method and apparatus using two antennas rotating at the same distance about a common axis is disclosed by Carr et al in U.S. Pat. No. 4,845,502. The time varying signals are multiplied to produce a low frequency component and a high frequency component. The low frequency component is used to determine azimuthal and elevation angles of the transmitter relative to the common axis, and the high frequency component is used to determine the incoming signal amplitude and frequency.

In U.S. Pat. No. 4,933,682, issued to Vaughn, a point-to-point microwave communication antenna is disclosed that can position a signal null in an arbitrary direction in which signal interference occurs. Two identical, parallel antenna horns are spaced apart by an adjustable distance $d = n\lambda$ that is chosen to position a "deep null" (at least 40 dB down) at an angle corresponding to receipt of an undesired and strong interfering signal from another source. Application of the apparatus to electromagnetic signal interferometry is discussed.

A system for determining direction or spatial attitude using receipt of GPS signals is disclosed by Hwang in U.S. Pat. No. 5,021,792. Three or more GPS signal-receiving antennas are arranged collinearly with known distances of separation, and GPS signals are phase sampled. Positions of two of the antennas are then exchanged, and the phase sampling is then repeated. The antennas are then arranged in a collinear pattern with known distances of separation, and phase sampling is repeated. From these three sets of data, the spatial orientation or attitude of the plane containing the antennas is calculated, using equations set forth in the patent. The inventor asserts that, with this approach, it is possible to reduce the minimum number of GPS satellites required from four to three.

In U.S. Pat. No. 5,148,179, Allison discloses a method for resolving the phase integers that requires use of either the L1 or L2 PRN code phase (also known as pseudorange). Filtering is required in the process to reduce the errors due to PRN code phase multi-path. Both the L1 and the L2 carrier phase measurements are also required. The method can be used on moving platforms encountered in photogrammetry and hydrography.

Dynamic differential position determination, using carrier phase measurements at both the carrier frequencies $f_{L1}$ and $f_{L1}$, is disclosed by Hatch in U.S. Pat. No. 4,812,991. Hatch determines uncorrected pseudoranges from each of four or more satellites to a reference receiver of known position and to a roving receiver, both on the ground. Hatch also uses L1 and L2 carrier phase differences and filters the L1 and L2 pseudorange information, then further processes the filtered pseudorange data to obtain smoothed range data from each satellite to each receiver. Both L1 and L2 pseudoranges are required. Differences of the smoothed range data and theoretical range data are formed for each satellite-reference receiver combination to aid in determining the position of the roving receiver.

In the article, "The Antenna Exchange: One Aspect of High-Precision GPS Kinematic Survey", by Benjamin W. Remondi and Bernhard Hofmann-Wellenhof, presented at the International GPS Workshop in Darmstadt, Federal Republic of Germany, Apr. 10–13, 1988, a method is disclosed in which the phase integers are resolved by exchanging the positions of a reference receiver antenna and a roving receiver antenna, while maintaining satellite signal tracking. In the Remondi method, which is compared later with the disclosed invention, both the reference and roving receiver antennas are physically moved. Details of this method are given in the paper, "Kinematic and Pseudo-kinematic GPS", by Benjamin W. Remondi, presented at the International Technical Meeting of the Satellite Division of the Institute of Navigation, Colorado Springs, Colo., Sep. 19–23, 1988. This paper describes the same method, referred to as the Antenna Exchange method. Remondi suggests that use of five satellites is a practical minimum, and use of six or more is recommended. The process described with the aid of equations contained in this paper uses a triple-difference intermediate stage and requires computation of the relative position of the receiver antennas.

An accepted static survey field procedure orients the antennas at two ends of a baseline to the same arbitrary azimuthal angle relative to a fixed line drawn to one of the magnetic poles. This procedure is mentioned in "Trimble Model 4000SX GPS Surveyor, Installation and Repair Manual", part number 12395, page 12, published July 1987. To implement this procedure, a precision Geodetic Antenna, available from Ashtech, Sunnyvale, Calif., incorporates a compass with a single independent GPS antenna. See J. Ashjaee, "Precision Survey With Ashtech XII, The All-in-one, All-in-view", Proceedings of the Fifth International Geodetic Symposium on Satellite Positioning, Mar. 13–17, 1989, New Mexico State University, pp. 316–329. The antenna orientation is chosen to cancel the errors in relative position determination caused by misalignment between the physical centers and the electrical phase centers of the antennas and errors through movement of the phase centers as a function of satellite azimuth and elevation. The azimuthal angles need not be recorded and need not be utilized during any stage of the relative position determination, including determination of integer ambiguities. The azimuthal angle of one antenna relative to another antenna is not observed in this approach. Effects of antenna phase center movement have been investigated and reported by Michael Sims in "Phase Center Variation in the Geodetic T14100 GPS Receiver System's Conical Spiral Antenna", presented at the First International Symposium on Precise Positioning with the Global Positioning System, Rockville, Md., Apr. 15–19, 1985.

Many of these methods require a time-consuming or complicated initialization procedure, or require triple-difference processing. What is needed is a method that permits accurate differential positioning by resolving the unknown phase integers associated with carrier phase measurements by relatively simple procedures. The method should be equally reliable in scenarios when the magnitude of the multi-path errors on PRN code phase measurements is large, and such large multi-path errors should not delay the initialization procedure. In addition, the method should work reliably with as few as four satellites with suitable geometry. In addition, the method should allow the easy addition of roving stations into an existing network of reference and roving stations without disturbing the differential positioning already in progress, by ensuring that the phase center of the reference station antenna remains fixed relative to the Earth.

SUMMARY OF THE INVENTION

The invention is a method that satisfies these requirements with a minimum addition of hardware (signal reception and processing circuitry, and antenna mounting apparatus) to GPS or GLONASS receivers in which the invention is embodied. The invention provides a method of processing L1 and/or L2 signal received from GPS or GLONASS satellites at two or more GPS or GLONASS receivers that allows accurate determination of the relative positions of one or more roving receivers and one or more reference receivers. These relative positions, also known as differential positions, baseline vectors, or baselines, can be expressed as vector components in an Earth-centered, Earth-fixed coordinate system, or can be translated into other terrestrial coordinate systems.

Measurements of received carrier phase at the L1 and/or L2 frequencies are utilized. If both frequencies are utilized simultaneously, linear combinations of the L1 and L2 carrier phase measurements can be formed. Two of these combinations are referred to as the wide-lane phase and the narrow-lane phase. Other linear combinations also exist which can be used by the method. The wide-lane phase, $\Phi_w$, is generated by subtracting measurements of the received carrier phase at the L1 and L2 frequencies. The wide-lane phase $\Phi_w$ has an associated wavelength. $\lambda_w = c/f_w$ (c=light velocity in vacuum), also known as the (wide) lane width, equal to that of a signal with a frequency given by the difference $f_w = f_{L1} - f_{L2} = c/\lambda_w$ of the L1 and L2 frequencies. The narrow-lane phase, $\Phi_n$, is generated by adding measurements of the received carrier phase at the L1 and L2 frequencies. The narrow-lane phase $\Phi_n$ has an associated wavelength $\lambda_n = c/f_n$, equal to that of a signal with a frequency given by the addition $f_n = f_{L1} + f_{L2} = c/\lambda_n$ of the L1 and L2 frequencies. Using pure L1 or L2 carrier phases, or a linear combination of these phases, results in a significant advantage, as the magnitude of the pseudorange multi-path errors have no impact on the method.

Measurements of either the L1 pseudorange or the L2 pseudorange are not directly required in the method of differential positioning. Whether the method uses only measurements of the L1 carder phase, or only measurements of the L2 carrier phase, or a linear combination of both L1 and L2 carrier phase, these measurements can be provided by a receiver using a channel configuration as described in "A Geodetic Survey Receiver with up to 12 L1 C/A-Code Channels, and 12 L2 Pseudo-P-Code Channels", presented by M. T. Allison, D. Farmer, G. Lennen, and K. Martin at the Third International Technical Meeting of the Satellite Division of the Institute of Navigation, Colorado Springs, Colo., September 1990. Alternatively, a receiver can be used that has an independent L2 P-code channel for each of the received satellite signals, or that has an independent L1 P-code channel for each of the received satellite signals. An example of such a receiver is the Model 4000SSE Geodetic Survey Receiver manufactured by Trimble Navigation Ltd, Sunnyvale, Calif., introduced in July 1992.

The phase integers under discussion, also called double-difference ("DD") integers, are associated with double difference phase measurements that are formed by differencing phase measurements between two or more satellites and two or more receivers. This approach eliminates the detrimental effects of receiver clock and satellite clock inaccuracies. Because each of the phase measurements is associated with an unknown integer, the double-difference phase measurements are associated with unknown DD integers.

In the above discussion, and hereafter, the term "phase measurement" may refer to either an L1 phase measurement, or an L2 phase measurement, or a wide-lane phase measurement, or a narrow-lane phase measurement, or a phase measurement formed by any linear combination of L1 and L2 phases. The different types of phase measurement are associated with different magnitudes of noise and errors. One source of error for the phase measurements is ionospheric refraction. Providing the stations are relatively close, the effect of ionospheric refraction on the double-difference phase measurements is negligible, as both stations observe similar ionospheric errors which cancel when the phase measurements are differenced. Because the method disclosed here does not utilize pseudorange measurements, errors caused by the different algebraic sign of the ionospheric phase delay (affecting the L1 and L2 phase measurements) and the ionospheric group delay (affecting the L1 and L2 pseudorange measurements) have no impact on the method.

The method of resolving the DD phase integer ambiguities uses a process that occurs in two stages, although in modifications of the method the second stage may be omitted. For each stage, the position of the reference receiver antenna is unchanged. For the first stage, the roving receiver antenna position is at a small, arbitrary distance from the reference receiver antenna, for example 30 centimeters. This distance need not be measured, and its value is not needed for this method. For the second stage, the rover receiver antenna is moved to a position diametrically opposite its original position, and at the same distance from the reference receiver antenna as in the first stage. Thus, the reference receiver antenna occupies a single position, while the roving receiver antenna occupies two positions, and the three positions are collinear. The only constraint in choosing the roving receiver position for the first stage, is that the positions for both stages must allow good satellite visibility from both the reference receiver and roving receiver antennas so that continuous tracking of four or more satellites is possible.

A single set of carrier phase measurements is required from all satellites when the roving receiver antenna is occupying each of the two described positions relative to the reference receiver antenna. Thus, two sets of carrier phase measurements are obtained. In addition, the satellites positions are required at these two times. These positions can be obtained using the satellite orbital ephemerides information broadcast by the satellites. In addition, an approximate value of the absolute reference receiver position is required. Provided that the distance between the reference-receiver and roving receiver in either the first stage or second stage position is considerably less that the distance from the receivers to the satellites, which is the usual situation, knowledge of the absolute or relative positions of the roving receiver in either position is not required. The ability to resolve the DD integer ambiguities without knowledge or computation of the roving receiver position(s) significantly reduces the complexity of the method.

Additional roving receivers can be placed in the first and second stage positions to enable resolution of the DD integers associated with each reference receiver and roving receiver pair. At all times the position of the phase center of the reference receiver antenna is undisturbed. Thus, expanding the network of receivers by adding roving receivers can occur independently of real-time differential positioning already in progress between the reference receiver and existing roving receivers. Such expansion can also occur independently of data collection already in progress at the reference receiver(s) and roving receiver(s). These data can be post-processed at a later time to yield differential positions.

Roving receivers may be designated as reference receivers, and conversely, at any time following the described initialization procedure.

Moving the roving receiver antenna to the required positions for the two stages required by the method, can be implemented by a mechanical device. A suitable device is an arm, optionally attached to a tripod, which can be rigidly fixed, and has brackets to which antennas may be easily attached and detached. Alternatively, the arm may be allowed to rotate the roving antenna about the fixed reference antenna. In this situation, the roving antenna need not be detached for the second stage; the arm together with the roving antenna can be rotated by 180° to the diametrically opposite position, without moving the effective center of the reference receiver antenna.

Following completion of the second stage measurements, the roving antenna can be moved to other positions that require relative position determination. If tracking of at least four satellites cannot be maintained, the described process may be repeated, or some other initialization technique may be used.

If the distance between the reference and roving receiver antenna is sufficiently small for the first stage, compared to the wavelength of the chosen type of carrier phase measurement, the DD integers can be correctly determined from the first stage estimates of the DD integers, and the requirement for the second stage measurements can be eliminated. Because of practical considerations concerning antenna size, this situation is most likely when using wide-lane carrier phase measurements, which are associated with an increased wavelength or lane-width.

A modification to the method, useful in eliminating the necessity for determination of the DD phase integers in the second stage, determines the azimuthal angle of the roving receiver antenna relative to the reference receiver antenna. Any device that can measure azimuth is suitable, for example, a magnetic compass. However, such a device may not operate at certain global locations such as the magnetic poles. The azimuth may be determined without a mechanical device by using heavenly bodies such as the sun and stars, although this requires a clear view of the sky. In this modification, in which azimuthal angle is measured, measurement of the distance between the antennas is performed for a single stage; measurement of this distance for a second stage is not required. This method can be implemented by use of a mechanical device, such as an arm with brackets set at a known distance apart to which the antennas can be attached, and which incorporates a built-in azimuth measurement device. The apparatus suitable for the two-stage method can be adapted to include the azimuth device so that either method can be used. Apparatus with a built-in azimuth measurement device provides a choice of methods so that DD integer determination can occur at all global locations.

Once the DD phase integers are determined, the phase measurements, together with the phase integers, provide $n-1$ unambiguous double-difference measurements using n satellites ($n \geq 4$). These measurements, together with calculations of satellite positions using the satellite ephemerides, and a sufficiently accurate absolute position of the reference station, provide the information required to calculate differential positions. Least squares or Kalman filter techniques are then used to compute the differential positions between the two receivers (the baseline vector). Differential positions are computed that minimize the errors in a set of simultaneous equations that describe the relationship between the measurements, the satellite positions, and the receiver positions.

Determination of the DD phase integers, followed by differential position determination, can be performed in real time if the roving receivers can receive communications from the reference receivers, or in a post-processing mode using data collected independently at each station in other situations.

If the P-code transmitted on L2 is encrypted into Y-code, the method of processing signals to resolve the DD phase integers using L2 carrier phase measurement can still be used, provided that the receiver can still make measurements of L2 carrier phase. For example, the 4000SSE receiver mentioned above is capable of making such measurements by cross-correlating the L1 and L2 signals. Another approach, under conditions of L2 P-code encryption, squares the L2 signal. This operation halves the wavelength of the L2 signal, halves the associated wavelength of the L2 carrier phase measurement, and has a corresponding effect on the associated wavelengths of the wide-lane phase and the narrow-lane phase. Alternatively, the L1 C/A code carrier phase measurements may be used alone, and L2 channel encryption has no effect.

One embodiment of the invention uses a configuration that includes a reference receiver antenna located at a fixed position plus a roving receiver antenna located at each of two positions that are equidistant from the reference receiver antenna position, the three antenna positions being collinear. This approach differs from the approach of Remondi, discussed earlier, which uses measurements with one reference receiver antenna position and one roving receiver antenna position; the two antenna positions are then exchanged or swapped so that both antennas must be moved in the Remondi approach. In a second embodiment of the invention, measurements from a single receiver antenna position and a single roving receiver antenna position are used, and the two antennas should be located within one half an effective wavelength from each other; no antenna movement is required. In a third embodiment, measurements from a single reference receiver antenna position and a single roving receiver antenna position are again used, and the azimuthal angle of a line containing these two antenna positions is determined as part of the measurements. In the first and third embodiments, the distance from reference receiver antenna to roving receiver antenna is unrestricted.

DESCRIPTION OF PREFERRED EMBODIMENTS OF THE INVENTION

Figure 1:
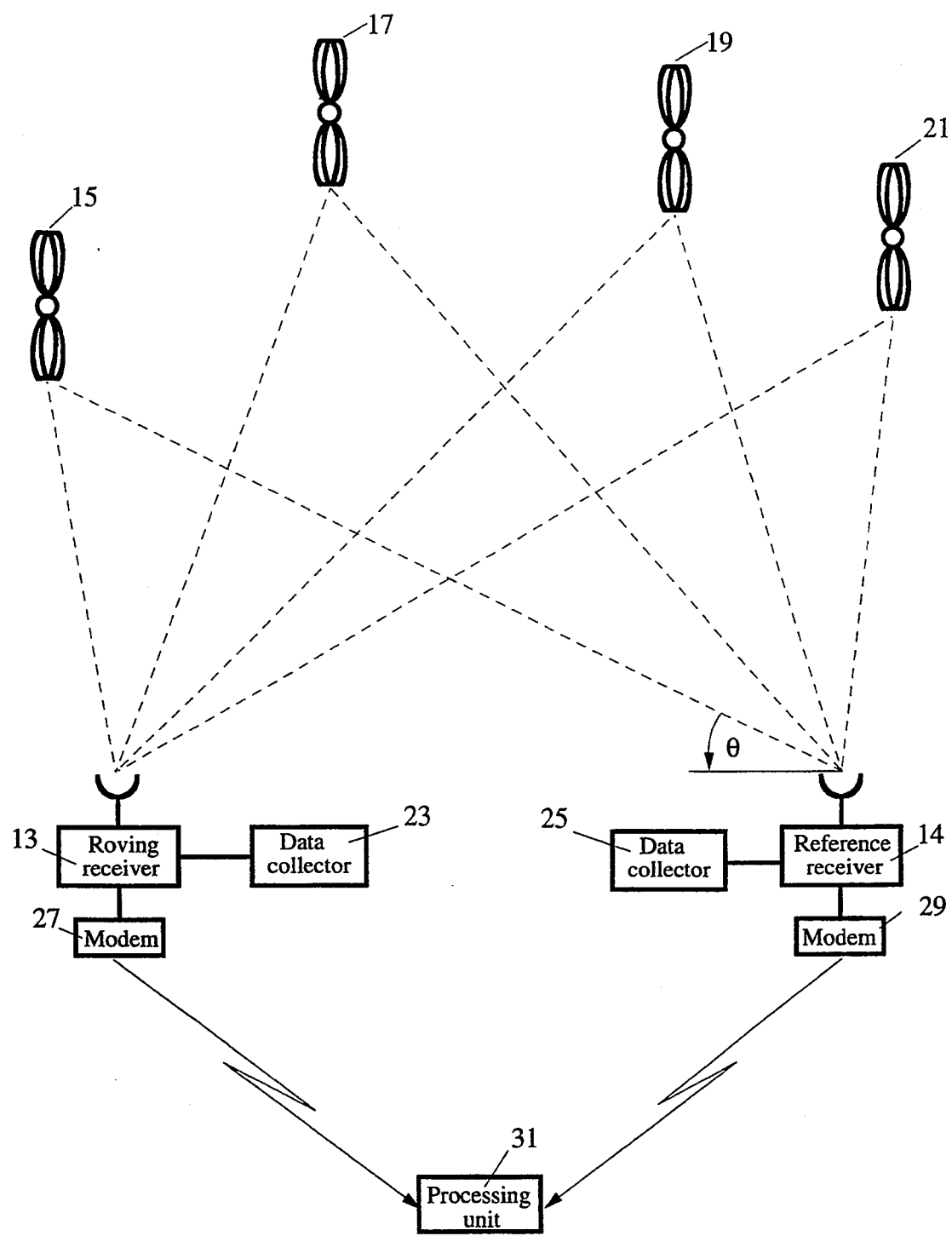
FIG. 1 is a schematic diagram illustrating a differential positioning system utilizing four or more Earth-orbiting satellites, a reference receiver and a roving receiver according to the invention.

FIG. 1 illustrates the preferred embodiment of the apparatus, which allows accurate determination of the position of one or more roving receivers (also known as stations) relative to a reference receiver, using radio-signals received from a plurality of n ($\geq 4$) Earth-orbiting satellites. The Global Positioning System (GPS) and the Global Orbiting Navigation Satellite System (GLONASS) are two satellite systems that meet the requirements of the invention. The GPS will be used to describe the currently preferred embodiment.

In its simplest form, the apparatus utilizes only two GPS receivers 13 and 14, as shown in FIG. 1. One of these receivers 14 is designated as the reference receiver, and is stationary relative to the Earth while the DD phase integers are being determined. However, there is no constraint that the reference receiver 14 be non-moving relative to the Earth after the DD integers have been determined (integer initialization). The other receiver 13, referred to as the roving receiver, has one or more positions (which need not be measured) relative to the reference receiver while the DD integers are being determined, and is usually in motion relative to the reference receiver following DD integer determination. However, there is no requirement that the receiver 13 be moving following DD integer determination. The apparatus in which the invention is embodied can be expanded to include multiple reference and roving receivers.

Each of the receivers 13 and 14 can receive L1 and/or L2 carrier signals from a plurality of n ($\geq 4$) GPS transmitting satellites 15, 17, 19 and 21. Each of the receivers 13 and 14 is capable of making a measurement of the L1 and/or L2 fractional carrier phase $\Phi(0° \leq \Phi < 360°)$ at precise time marks generated by the receivers.

These measurements can be stored in data collection modules 23 and 25, connected to the receivers 13 and 14, respectively, and can be processed at a later time. Preferably, however, these measurements are transmitted via radio modems 27 and 29 to a signal processing unit 31 for processing. FIG. 1 illustrates radio communication between the receivers 13 and 14 and the processing unit 31. However, any form of communication, such as direct electrical connections, can be used. The processing unit 31 may be located at the roving receiver 13, at the reference receiver 14, or at any other location that allows communication with the receivers 13 and 14. If desired, the processing unit 31 may be integrated into either receiver. The invention could be expanded to include multiple data processing units, which may be integrated into one or both of the receivers 13 or 14. The measurements may be taken at any time interval, for example, once per second.

Initially, a method is described in which only L1 or L2 carrier phase measurements are used. Wide-lane or narrow-lane carrier phase measurements may be substituted for the L1 or L2 carrier phase measurements and are described later. The receivers 13 and 14 measure the Lk (k=1,2) carrier phase $\beta_{ij;Lk}$ (i=15, 17, 19, 21; j=13, 14) for that satellite number i and receiver number j.

In each of the receivers 13 and 14, the measurements from three of the four satellites are differenced against the measurements for the remaining satellite, which is referred to as the base satellite and can be any one of the four satellites. This produces three measurements, called single-difference phase measurements, for each receiver 13 and 14. These measurements are then differenced between the two receivers 13 and 14 to yield three double-difference phase measurements, each of which is derived from measurements from only two satellites. For brevity, these measurements are hereafter referred to as simply phase measurements. Computing double-difference measurements eliminates the effects of the clocks within the receivers and within the satellites. This simplifies and increases the accuracy of the differential position method.

The phase measurements can be used to define a set of three or more simultaneous equations for certain double-difference phase values $\Phi_{i,i';j,j';Lk}$ of the form given by Eq. (1) below, with each Equation referring to the same instant $t_p$ in time in a sequence of such times.

$$\Phi_{i,i';j,j';Lk} = -\Delta R_{i,i';j,j'}/\lambda_{Lk} + N_{i,i';j,j'}, \quad (1)$$

$$\Phi_{i,i';j,j';Lk} = [\beta_{i,j;Lk} - \beta_{i',j;Lk}] - [\beta_{i,j';Lk} - \beta_{i',j';Lk}]. \quad (2)$$

Here, the double-difference phase variables $\Phi_{i,i';j,j';Lk}$ are determined from the known, measurable phases $\beta_{i,j;Lk}$, where i and i' refer to satellite numbers and j and j' refer to receiver numbers. $\Delta R_{i,i';j,j'}$ is the double-difference theoretical range, defined in Eqs. (3)-(5) below, between the satellites i and i' and the receivers j and j', which can be calculated from a knowledge of the satellites' positions, the reference receiver position, and an estimate of the roving receiver position. The quantities $\Delta R_{i,i';j,j'}$ are computed using double-difference ranges from the receivers 13 and 14 to the satellites, as illustrated in FIG. 1, and are determined by the relations $$\Delta R_{15,17;13,14} = (R_{15,13} - R_{17,13}) - (R_{15,14} - R_{17,14}), \quad (3)$$

$$\Delta R_{15,19;13,14} = (R_{15,13} - R_{19,13}) - (R_{15,14} - R_{19,14}), \quad (4)$$

$$\Delta R_{15,21;13,14} = (R_{15,13} - R_{21,13}) - (R_{15,14} - R_{21,14}). \quad (5)$$

Here, $\lambda_{Lk} = c/f_{Lk}$ is the Lk wavelength (c=speed of light), and $R_{i,j}$ is the theoretical range ("theorange") from satellite vehicle number i to receiver number j. The numbers $N_{i,i';j,j'}$ are DD phase integers, determined by and corresponding to the phase variables $\Phi_{i,i';j,j';Lk}$ for two satellites numbered i and i' and two receivers numbered j and j'.

For the two receivers 13 and 14, and the four satellites 15, 17, 19 and 21 shown in FIG. 1, the terms on the right side of Eqs. (3)-(5) can be expressed in terms of the coordinate differences $$R_{i,j} = [(x_j - x_i)^2 + (y_j - y_i)^2 + (z_j - z_i)^2]^{\frac{1}{2}}, \quad (6)$$

where $(x_j, y_j, z_j)$ and $(x_i, y_i, z_i)$ are the Cartesian coordinates, in an Earth-centered, Earth-fixed (ECEF) coordinate system, of receiver number j and satellite number i, respectively, and the satellites' coordinates are computed using the available satellite ephemerides transmitted by each satellite.

The DD phase integers, which should be determined, are constants unaffected by relative receiver motion, if the satellite signals are continuously tracked. Equation (1) can be rearranged so that an estimate of the DD integer, $N_{e;i,i';j,j'}$, referred to for brevity as $N_e$, is given by $$N_{e;i,i';j,j'} = \Phi_{i,i';j,j';Lk} + \Delta R_{e;i,i';j,j'}/\lambda_{Lk}. \quad (7)$$

Here, $\Delta R_{e;i,i';j,j'}$ are estimates of the double-difference theoretical range, which are determined first, and then used to determine the DD phase integers $N_e$.

In a first stage of the process, the roving receiver antenna is placed at a small and arbitrary distance d, for example, 30 centimeters, from the reference receiver antenna. Knowledge of the value of d is not required, and its magnitude may be many wavelengths of the received signal phase. For the purpose of computing the estimated DD phase integers $N_e$ using Eq. (7), the (unknown) position of the roving receiver is assumed to be identical to the reference receiver position: the distance d is zero or approximately zero. Thus, Eq. (6) is modified to give estimated theoranges, $R_{e;i,j}$, viz.

$$R_{e;i,j} = [(x_1 - x_i)^2 + (y_1 - y_i)^2 + (z_1 - z_i)^2]^{\frac{1}{2}}, \quad (8)$$

where $(x_1, y_1, z_1)$ are now the Cartesian coordinates of the reference antenna. These estimated theoranges are used to obtain $\Delta R_{e;i,i';j,j'}$ using Eqs. (3)-(5), which in turn are used to obtain the phase integers $N_e$, using Eq. (7).

The assumption that the reference and roving antenna are at the same position, i.e., that the distance d is (approximately) zero, results in a set of errors, $E_{i,i';j,j'}$, denoted for brevity as E, in the estimate of the DD phase integers $N_e$. These errors can be expressed, in units of lane wavelengths, as $$E = N_{e;i,i';j,j'} - N_e. \quad (9)$$

Each value in the set of erroneous values represented by $N_e$ is associated with an error in the set E. The magnitudes of these errors depend upon the magnitude of d, and upon the true positions of the receivers and satellites. If the magnitude of each of the "length errors" $\lambda_{Lk}E$ is less than a half wavelength, $\lambda_{Lk}/2$, then the correct DD phase integers could be directly determined from the estimates $N_e$. However, this is not the usual situation, due to the magnitude of d, which is determined by practical considerations such as the antenna width.

In a second stage, the roving receiver antenna is moved to a position diametrically opposite its original position, and at the same distance d from the reference antenna as in the first stage, without interruption of satellite signal tracking. The position of the reference antenna is unchanged. Thus, the reference antenna occupies a single position, while the roving antenna occupies two different positions, and the three receiver antenna positions are collinear. The only constraint in choosing the roving receiver antenna position for the first stage is that the positions for both stages must allow good satellite visibility from both the reference and roving receiver antennas; continuous tracking of four or more satellites must be possible at all times. This is easily achieved.

With the roving antenna at its second position, estimates of the DD phase integers, $N_e$, are made again, using Eqs. (7) and (8), and once again produce errors given by Eq. (9). The first set of estimates associated with the first stage are referred to as $N_{e(1)}$, and the second set of estimates associated with the second stage are referred to as $N_{e(2)}$. These sets $N_{e,(1)}$ and $N_{e,(2)}$ are associated with sets of errors, due to the assumption that the distance d is zero as already described, given by the first and second stage errors $E_{(1)}$ and $E_{(2)}$, respectively. In view of these errors, the values of the estimates $N_{e,(1)}$ and $N_{e,(2)}$ are not integers, but are real numbers with fractional parts that may be non-zero.

It will be shown later that, provided that movement of the satellites during the time taken to perform measurements in the two stages is short, which is the usual situation, the following relation between the first and second stage errors holds:

$$E_{(1)} \approx -E_{(2)}. \qquad (10)$$

From this relation, an improved estimate of a DD phase integer is given by the arithmetic mean of the estimates $N_{e,(1)}$ and $N_{e,(2)}$ computed in the first and second stages. In taking the arithmetic mean, the errors $E_{(1)}$ and $E_{(2)}$ cancel. This yields the correct value for a phase integer $$N_{i,i';j,j'} = \text{floor}[(N_{e,(1)} + N_{e,(2)})/2 + 0.5]. \qquad (11)$$

Here, floor[] (also known as the integer part operator) is a standard mathematical function that returns the largest integer that is not greater than its argument. Inclusion of an additive term 0.5 in the argument of the floor function performs a rounding operation (to the nearest integer) so that the DD phase integers given by the left side of Eq. (11) are true integers. This rounding is necessary to account for measurement noise and residual errors from other sources, such as ionospheric refraction as already mentioned, and from small errors due to satellite movement relative to the receivers during the time taken to perform the two stages.

Thus, the DD phase integers are resolved by computing estimates of the DD integers with the roving antenna in two positions, referred to as the stage 1 and stage 2 positions, and taking the arithmetic mean of these two estimates. The method does not involve computation of the relative positions of the reference receiver antenna and roving receiver antenna and does not require triple-difference processing techniques, which simplifies the method. A minimum of four satellites is required, although more than four satellites may be used.

Following the determination of the DD phase integers, also known as integer initialization, the roving receiver antenna may be moved to other (unknown) locations, and differential positioning may begin. When n satellites ($n \geq 4$) are used for the measurements of the theorange quantities in Eqs. (3)–(5), Eqs. (1) become $n-1$ simultaneous equations ($n-1 \geq 3$) to be solved for the three roving receiver antenna coordinates.

Equations (1) can be solved using various techniques to provide a best estimate of the differential position of the roving receiver 13 with respect to the reference receiver 14. For example, the technique of least squares, or Kalman filtering, or square-root information filtering can be employed. If n ($>4$) satellites are available, $n-1$ ($>3$) simultaneous equations can be formed. These simultaneous equations can be used to determine the differential position of a roving receiver, using one of the techniques mentioned, and the system of equations will be overdetermined. In general, the solution method will find an optimal value of the differential position of the roving receiver 13, producing values of $\Delta R_{i,i';j,j'}$ in Eq. (1) that minimize the errors in those equations. In addition to the measurements made on the L1 and/or L2 signals, the position of the reference receiver 14 must be known with sufficient accuracy. This position, if unknown, can be obtained using accepted methods of absolute positioning which use either L1 or L2 non-differenced pseudorange measurements.

Figure 2A:
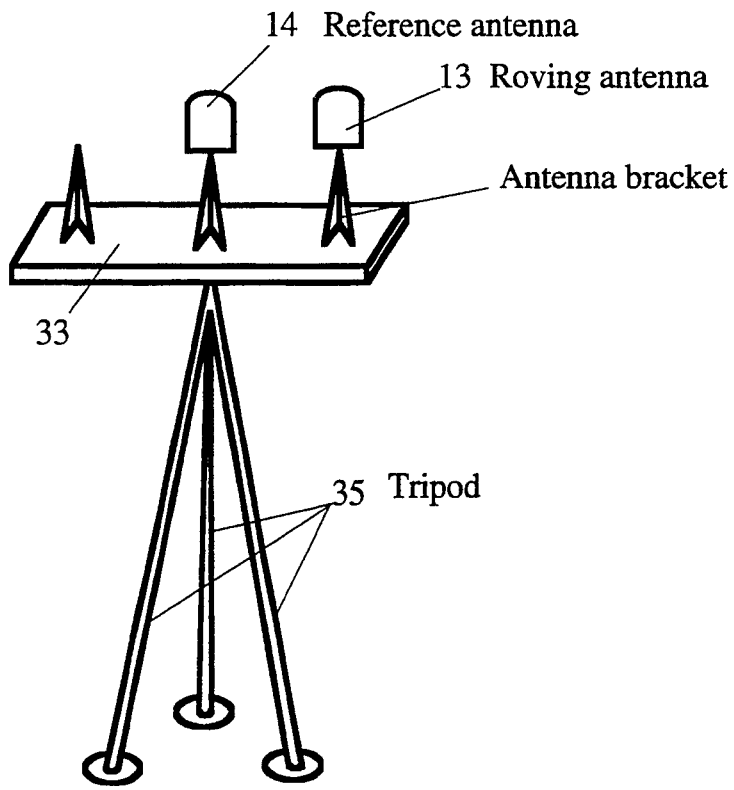
FIGS. 2A, 2B, 2C are schematic diagrams illustrating a fixed mechanical apparatus used to facilitate positioning of the roving receiver antenna at two positions relative to the fixed reference receiver antenna.
Figure 2B:
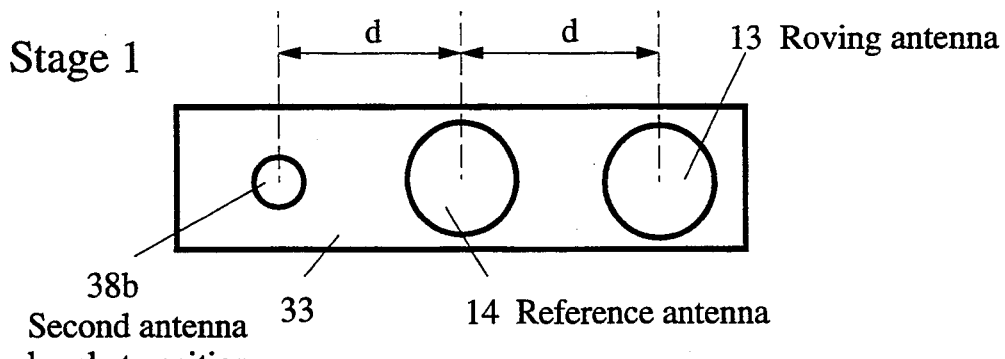
Figure 2C:
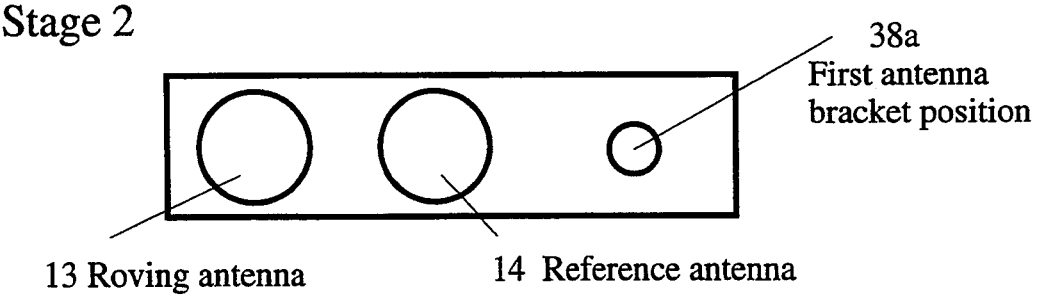

Moving the antenna of the roving receiver 13 to the required position, for each of the two stages required by the method, can be implemented by a mechanical device illustrated in FIG. 2A. This device includes an arm 33, optionally attached to a tripod 35, with arm and tripod being rigidly fixed to each other, and having three brackets to which antennas can be easily attached and detached. The central bracket to which the antenna of the reference receiver 14 is attached, is positioned over the desired reference station position (the survey control point). The two remaining brackets are at the same distance from the center and are diametrically opposite each other. The reference receiver antenna position and the stage 1 and stage 2 roving receiver antenna positions are collinear. The roving receiver antenna is attached to the first bracket position 38a for the first stage and to the second bracket position 38b for the second stage, as illustrated in FIGS. 2B and 2C. The height of the reference antenna above the survey control point can optionally be recorded, which allows the differential positions relative to the survey control point to be computed from differential positions relative to the antenna phase center. However, no particular heights for the receiver antenna positions are required by this method of DD phase integer determination.

Figure 3A:
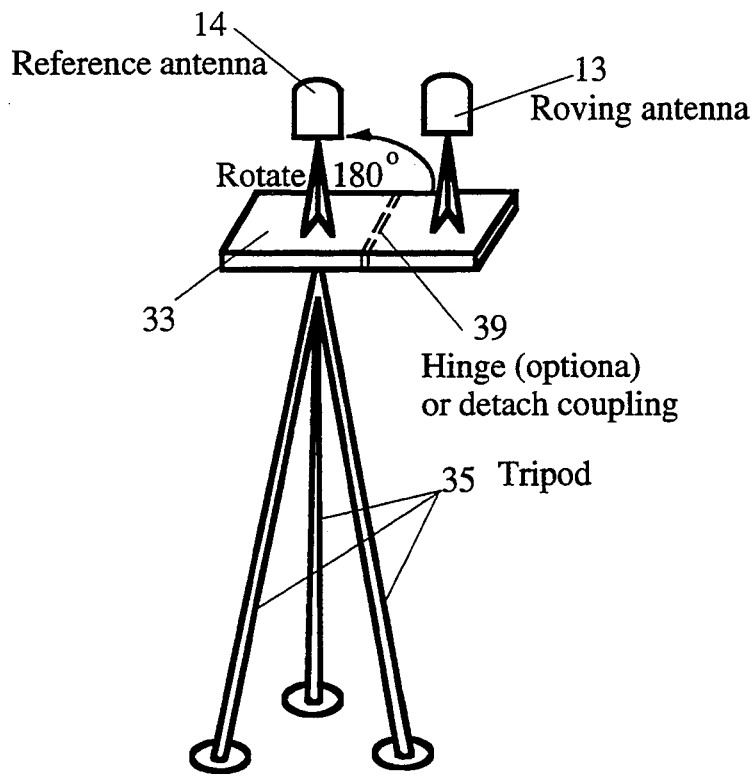
FIGS. 3A, 3B, 3C are schematic diagram illustrating a moving mechanical apparatus used to implement a 180° rotation of the roving receiver antenna about the fixed position of the reference receiver antenna.
Figure 3B:
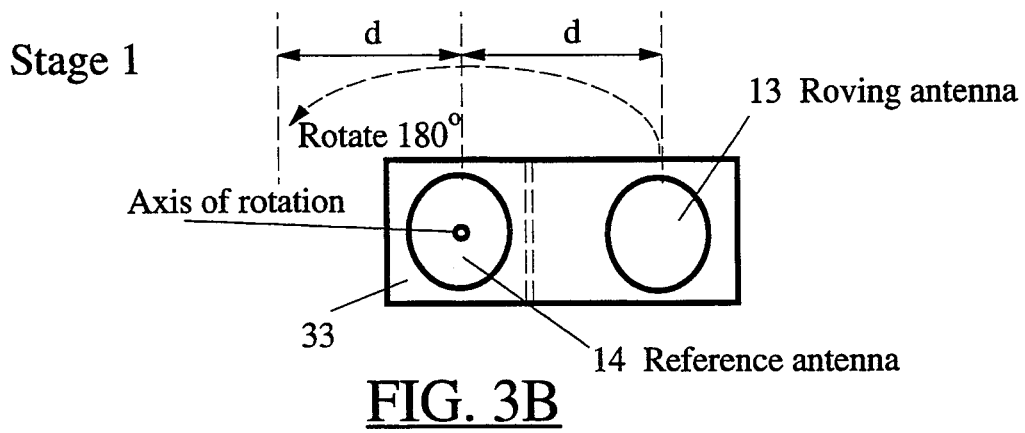
Figure 3C:
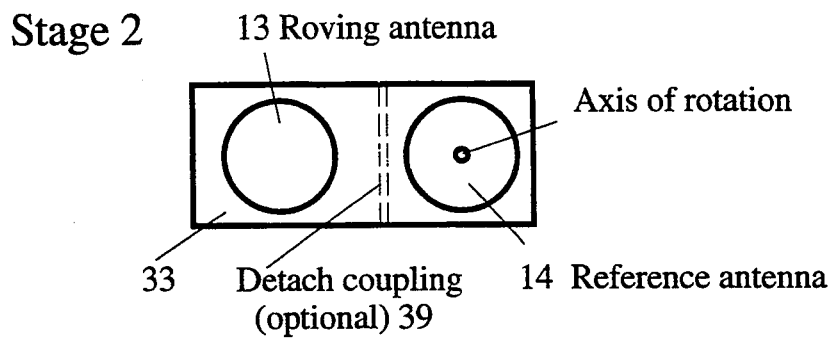

Alternatively, the mechanical arm 33 to which the antenna of the roving receiver 13 is attached may be allowed to rotate, as illustrated in FIGS. 3A, 3B and 3C. In this modification of the apparatus, the antenna of the roving receiver 13 need not be detached and re-attached for the second stage; the arm 33 together with this antenna can be rotated by 180° to the diametrically opposite position, without moving the center of the reference receiver antenna, as illustrated in FIGS. 3B and 3C. After the second stage measurements have been made and the roving antenna is removed, a section of the arm 33 may be removed or folded away, to increase the stability of the tripod or to reduce the length of the arm. FIG. 3A illustrates a mechanical arm with a hinge 39 that can be used to fold down a section of the arm 33. FIGS. 3B and 3C illustrate a mechanical arm 33 with a detachable coupling 39, from which a section of the arm may be removed.

The sets of errors represented by $E_{(1)}$ and $E_{(2)}$ in the estimates of the DD phase integers $N_{e,(1)}$ and $N_{e,(2)}$ in Eq. (9) can themselves be estimated using trigonometry, and can be shown to have approximately the same magnitude but opposite sign. This property results in cancellation of the errors $E_{(1)}$ and $E_{(2)}$ when the arithmetic mean of $N_{e,(1)}$ and $N_{e,(2)}$ is computed. The sets of errors $E_{(1)}$ and $E_{(2)}$ are caused directly by errors in the estimation of the double-difference theoretical ranges $\Delta R_{e;i,i';j,j'}$, which in turn are caused by errors in the estimation of the theoranges $R_{e;i,j}$. Only the theoranges associated with ranges from the roving antenna to the satellites are in error, because the position of the roving antenna is unknown (assumed initially to be the same as the position of the reference antenna), whereas the position of the reference antenna is known with sufficient accuracy. Thus, the error in the double difference theorange $\Delta R_{e;i,i';j,j'}$ includes two components for the two satellites used in the double-difference quantities. For simplicity, it is sufficient to consider only one of these components, namely the error in a theorange from the antenna of the roving receiver 13 to a single satellite, and to consider the value of this error when the roving receiver antenna occupies the two positions associated with the stages one and two used by the basic method. Provided that the errors in these theoranges for the two stages have the same magnitude and opposite signs, it follows directly from Eqs. (3)–(5) that the same is true for the errors in $\Delta R_{e;i,i';j,j'}$ for the two stages. Thus $E_{(1)}$ and $E_{(2)}$ have the same magnitude and opposite signs.

Figure 4A:
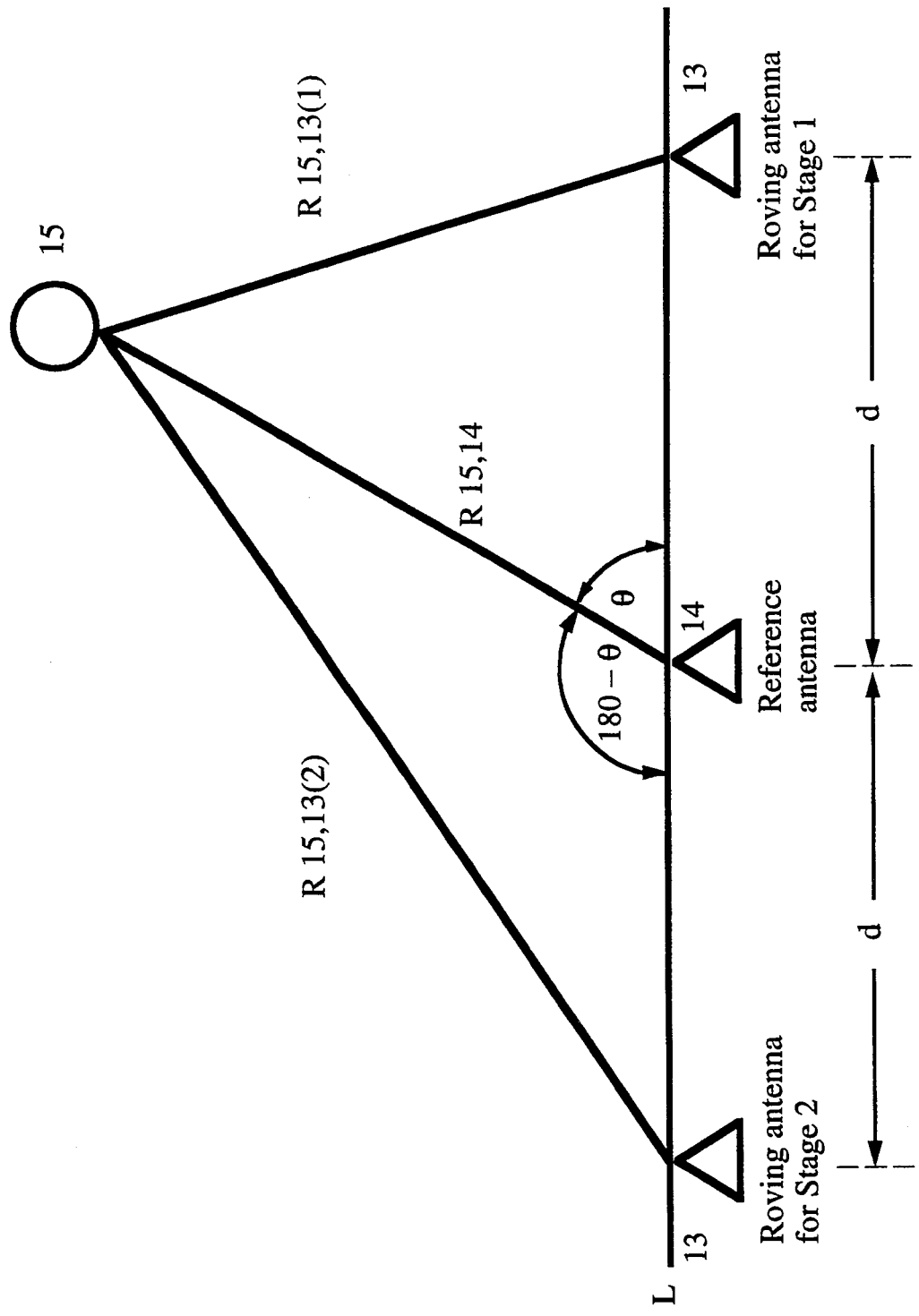
FIGS. 4A and 4B are schematic side and top views, respectively, illustrating angular configurations of a satellite, a reference receiver and a roving receiver in two measurement modes.

The errors in the theoranges $R_{i,j}$ are illustrated in FIG. 4A. Satellite 15 is chosen as an example. The theorange $R_{15,14}$ for the reference station has no significant error. For the first stage, the roving receiver antenna theorange is denoted $R_{15,13;(1)}$, and for the second stage, the roving receiver antenna theorange is denoted $R_{15,13;(2)}$. For simplicity, it is initially assumed that the satellite has zero azimuthal angle with reference to a line L passing through the three antenna positions, has an elevation relative to this (horizontal) line, and is stationary relative to the Earth. The distance from the reference and roving receiver antennas is d for each stage and is assumed small and arbitrary.

Specifically, the errors $E_{15,13;(1)}$ and $E_{15,13;(2)}$ in the estimated theoranges $R_{e;15,13;(1)}$ and $R_{e;15,13;(2)}$, respectively, are computed. Because the computation of these theoranges assumes the roving receiver antenna position is the same as the reference receiver antenna position, the errors are given by $$E_{15,13;(1)}=(R_{15,13;(1)}-R_{15,14})/\lambda_{Lk},(k=1 \text{ or } 2) \quad (12)$$

$$E_{15,13;(2)}=(R_{15,13;(2)}-R_{15,14})/\lambda_{Lk}. \quad (13)$$

Applying the cosine rule for triangles in FIG. 1, the following relation is obtained:

$$(R_{15,13;(1)})^2=(R_{15,14})^2+d^2-2R_{15,14}d\cos\theta, \quad (14)$$

where $\theta$ is the elevation angle at the antenna of the reference receiver 14. From Eqs. (12) and (14) the elevation angle $\theta$ is determined by $$\cos\theta=[d^2-(\lambda_{Lk})^2(E_{15,13;(1)})^2-2\lambda_{Lk}E_{15,13;(1)}R_{15,14}]/[2dR_{15,14}]. \quad (15)$$

Assuming that the distance d is very much less than the distance from the receivers to the satellites, which is the usual situation, Eq. (15) can be replaced by the approximation $$\cos\theta \approx -\lambda_{Lk}E_{15,13;(1)}/d, \quad (16)$$

From Eq. (16) the "length error" $\lambda_{Lk}E_{15,13;(1)}$ for stage 1 is given by $$\lambda_{Lk}E_{15,13;(1)} \approx -(d\cos\theta), \quad (17)$$

An expression for the length error $\lambda_{Lk}E_{15,13;(2)}$ for stage 2 is derived in an analogous manner, with $\cos\theta$ being replaced by $\cos(180°-\theta)$, as indicated by FIG. 4A, viz.

$$(R_{15,13;(2)})^2=(R_{15,14})^2+d^2-2R_{15,14}d\cos(180°-\theta) \quad (18)$$

Noting that $\cos(180°-\theta)=-\cos\theta$, and using the same approach as used in Eqs. (15)–(17), the second stage length error is determined to be $$\lambda_{Lk}E_{15,13;(2)} \approx d\cos\theta. \quad (19)$$

From FIG. 1 and Eqs. (17) and (19), it is concluded that, for the zero azimuthal angle situation, $$E_{15,13;(1)} \approx -E_{15,13;(2)}. \quad (20)$$

Figure 4B:
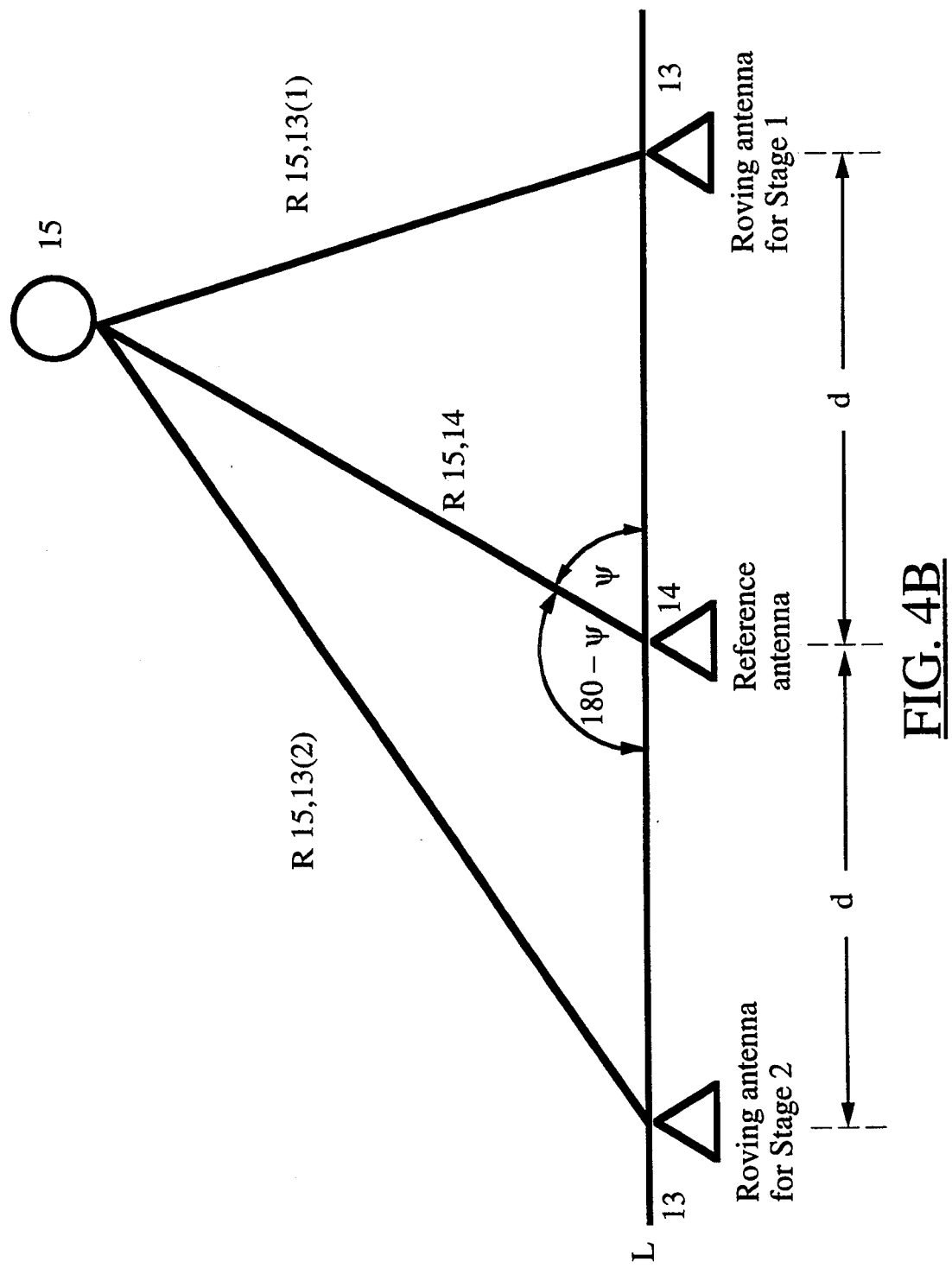

Next, the situation where the satellite elevation angle $\theta$ is zero (satellite lying in a plane tangential to the Earth at the reference receiver position) is considered, as illustrated in FIG. 4B. The azimuthal angle $\Psi$ is arbitrary here. Derivation of the errors $E_{15,13;(1)}$ and $E_{15,13;(2)}$ for the azimuthal plane is similar to the derivation in the previous case as given in Eqs. (12)–(20), and this yields the result $$\lambda_{Lk}E_{15,13;(1)} \approx -(d\cos\Psi)=-\lambda_{Lk}E_{15,13;(2)} \quad (21)$$

The general case is obtained by combining the results given for the preceding two cases with: (i) azimuthal angle $\Psi=0°$, elevation angle $\theta \neq 0°$ (FIG. 4A); and (ii) elevation angle $\theta=0°$, azimuthal angle $\Psi \neq 0°$ (FIG. 4B).

It is assumed that the satellite is in motion relative to the Earth. The elevation angle $\theta$ and azimuthal angle $\Psi$ become the values for the first stage. Provided that the change in the elevation and azimuth in the time taken to perform measurements for the two stages is small, which is the usual situation, good approximations to the errors are then given by $$\lambda_{Lk}E_{15,13;(1)} \approx -d(\cos\theta)(\cos\Psi), \quad (22)$$

$$\lambda_{Lk}E_{15,13;(2)} \approx d(\cos\theta)(\cos\Psi), \quad (23)$$

Thus, Eq. (20) is still valid for this general case. Cancellation of the errors $E_{(1)}$ and $E_{(2)}$ when taking the arithmetic mean of $N_{e,(1)}$ and $N_{e,(2)}$ relies on the result in Eq. (20). The general case is equivalent to allowing the line L shown in FIG. 4A to have any orientation with reference to the satellites. The only constraint is that the choice of the line L should not result in difficulty in continuous signal reception from at least four satellites for both stages.

The method has been described using L1 or L2 carrier phase measurements $\beta_{ij;Lk}$, used to form double-difference phase values $\Psi_{i,i';j,j';Lk}$ as given in Eq. (2). Alternatively, wide-lane carrier phase measurements $\beta_{ij;w}$ may be used for satellite i and receiver j. These are given in wide-lane units by $$\beta_{ij;w}=\beta_{ij;L1}-\beta_{ij;L2}(i=15,17,19,21;j=13,14) \quad (24)$$

For this situation, Eqs. (1), (2) and (7) are modified to become $$\Phi_{i,i';j,j';w}=-\Delta R_{i,i';j,j'}/\lambda_w+N_{i,i';j,j'} \quad (25)$$

$$\Phi_{i,i';j,j';w}=[\beta_{i,j;w}-\beta_{i',j;w}]-[\beta_{i,j';w}-\beta_{i',j';w}], \quad (26)$$

$$N_{e,i,i';j,j'}=\Phi_{i,i';j,j';w}+\Delta R_{e;i,i';j,j'}/\lambda_w. \quad (27)$$

Here, $\lambda_w$ is the wide-lane wavelength, given by $\lambda_w=c/f_w=c/(f_{L1}-f_{L2})$, for the wide-lane signal.

As another alternative, narrow-lane carrier phase measurements $\beta_{ij;n}$ may be used for satellite number i and receiver number j. These are given in units of narrow lane phases by $$\beta_{ij;n} = \beta_{ij;L1} + \beta_{ij;L2} (i=15,17,19,21; j=13, 14). \quad (28)$$

For this situation, Eqs. (1), (2) and (7) are modified to become $$\Phi_{i,i';j,j';n} = -\Delta R_{i,i';j,j'}/\lambda_w + N_{i,i';j,j'}, \quad (29)$$

$$\Phi_{i,i';j,j';n} = [\beta_{i,j;n} - \beta_{i',j;n}] - [\beta_{i,j';n} - \beta_{i',j';n}], \quad (30)$$

$$N_{e;i,i';j,j'} = \Phi_{i,i';j,j';n} + \Delta R_{e;i,i';j,j'}/\lambda_n. \quad (31)$$

Here, $\lambda_n$ is the narrow-lane wavelength, given by $\lambda_n = c/f_n = c/(f_{L1} + f_{L2})$ for the narrow-lane signal.

In addition to the wide-lane and narrow-lane phases given by Eqs. (24) and (28), other linear combinations of phase, of the general form $\beta_{ij;cp} = \alpha_1 \beta_{ij;L1} + \alpha_2 \beta_{ij;L2}$, can be used by the method for differential positioning, where $\alpha_1$ and $\beta_2$ are real numbers having arbitrary signs. These linear combinations of phase correspond to signals with effective frequencies $f_{cp} = \alpha_1 f_{L1} + \alpha_2 f_{L2}$ and with effective wavelengths $\lambda_{cp}$ given by $1/\lambda_{cp} = \alpha_1/\lambda_{L1} + \alpha_2/\lambda_{L2}$. The methods for resolving the DD phase integers, using either L1 carrier phase (cp =L1; $\alpha_1 = 1$, $\alpha_2 = 0$), L2 carrier phase (cp=L2; $\alpha_1 = 0$, $\alpha_2 = 1$), wide-lane carrier phase (cp =w; $\alpha_1 = 1$, $\alpha_2 = -1$), narrow-lane carrier phase (cp=n; $\alpha_1 = 1$, $\alpha_2 = 1$), or a general carder phase (cp) formed by any linear combination of the two carrier phases, is the same as for the situation using only the pure L1 or L2 carrier phase measurements $\beta_{ij;L1}$ and $\beta_{ij;L2}$, although the DD phase integers have units dependent on the effective wavelength of the phase measurements chosen.

In a modification of the method, if the distance d between the roving receiver antenna and reference receiver antenna for the first of the two stages is sufficiently small, the length errors $\lambda_{cp}E$ (cp=L1, L2, w, n or other, depending on choice of carrier phase) in the estimated DD phase integers $N_{e,(1)}$ for the first stage are less than a half wavelength of the carrier phase. In this situation, the second stage of measurements and computations is not necessary. Thus, this modified method becomes a single stage method. The correct DD phase integers $N_{i,i';j,j'}$ can be obtained directly from the estimated integers $N_{e,(1)}$ by using a modification of Eq. (11) given by $$N_{i,i';j,j'} = \text{floor}[N_{e,(1)} + 0.5]. \quad (32)$$

This modified method is most useful when using phase measurements with a large effective wavelength, such as the wide-lane phase. The maximum length error $\lambda_{cp}E_{max}$ in the estimate of the double-difference theoretical range $\Delta R_{e;i,i';j,j'}$ appears in a scenario in which the azimuth angle $\Psi$ is zero, the elevation angle $\theta$ of satellite number i is zero, and the elevation angle $\theta$ of satellite number i' is 90°. If the elevation angles were the same, the two components of error from the two satellites that contribute to $\lambda_{cp}E$ would cancel, producing E=0. Using Eq. (22), $\lambda_{cp}E_{max}$ can be shown to be equal to the antenna separation distance d shown in FIGS. 4A and 4B. Determination of the length error $\lambda_{cp}E_{(2)}$ for the second stage is unnecessary when the distance d is less than half the carrier phase wavelength $\lambda_{cp}$. For example, using the wide-lane phase, this occurs when $d < \lambda_w/2 = 43.1$ cm for GPS. In practice, the distance d is preferably much smaller than $\lambda_w/2$, to compensate for measurement noise. In this modification, as in the first method, the assumption $d \approx 0$ is used in Eq. (7) to compute the numbers $N_e$.

In a second modification of the method, determination of the DD phase integers for the second stage can also be eliminated. For this modification, the azimuthal angle $\Psi$ of the roving receiver antenna relative to the reference receiver antenna must be determined. Any device that can measure azimuth is suitable, for example, a magnetic or flux gate compass. However, a device such as a magnetic compass may not operate at certain global locations such as the magnetic poles. It is also possible to obtain the required azimuth using heavenly bodies such as the sun or stars, together with a chronometer and almanac, and without any other device. However, such determination of azimuthal angle would be unsuitable without a clear view of the sky.

Figure 5A:
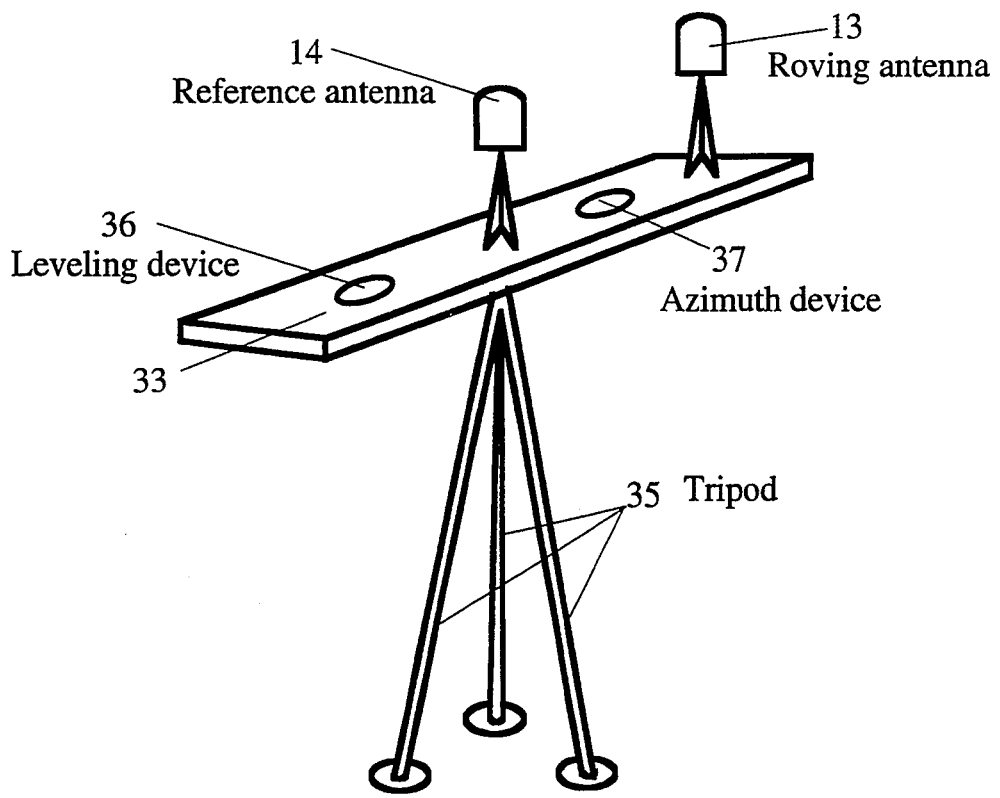
FIGS. 5A and 5B are schematic diagrams illustrating a mechanical apparatus used to facilitate positioning of the roving receiver antenna relative to the fixed reference receiver antenna using an azimuth measuring device and a leveling device.

In this second modification of the method, measurement of the distance d between the two antennas is required, and it is assumed that the line L passing through the positions of the reference receiver antenna and roving receiver antenna lies in a plane tangential to the surface of the Earth at the reference receiver antenna location. This method is implemented by an arm 33, such as illustrated in FIG. 5A, which is designed to hold the antennas at a known, fixed distance apart, with both antennas in the local tangent plane. The arm 33 incorporates a built-in azimuth indicating device 37 (e.g., a magnetic compass), to which the antennas may be rigidly attached, in which case a measurement of azimuthal angle must be made and recorded.

Figure 5B:
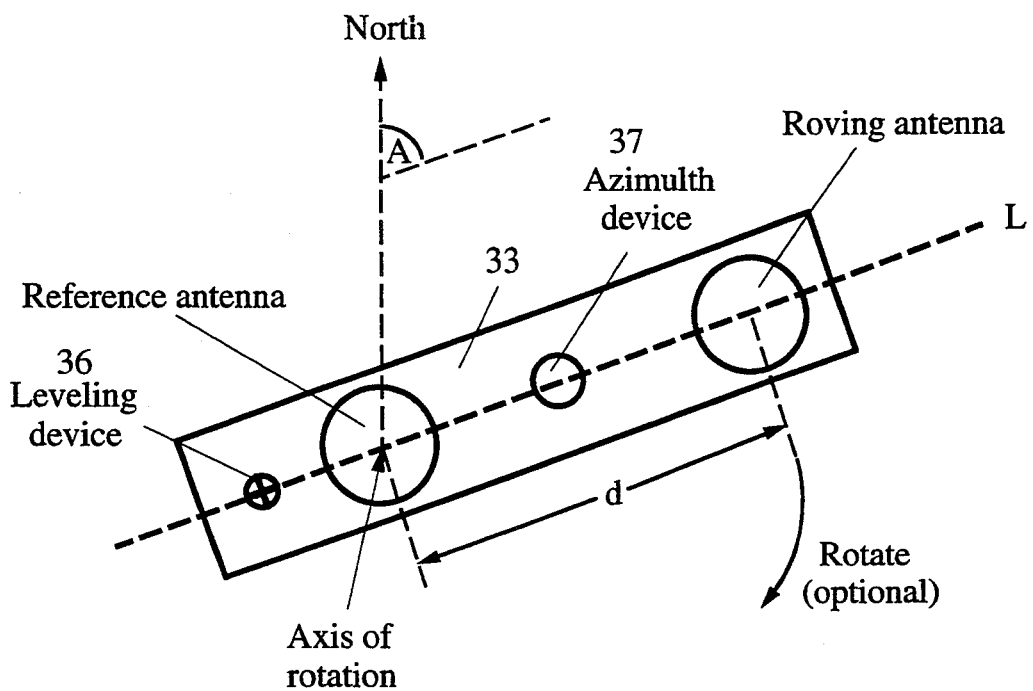

Alternatively, the arm 33 holding the roving receiver antenna may be free to rotate about the reference receiver antenna position, as illustrated in FIG. 5B, in which case the azimuthal angle $\Psi$ can be set to a predetermined value to be used for this method. For example, setting azimuthal angle $\Psi = 0°$ (chosen north direction) simplifies the estimation of the DD phase integers. Provided that the same value of azimuth is always used, this method can be modified to always use a given azimuthal angle value, and thus the value need not be recorded. For example, setting the azimuth in the chosen north direction without a mechanical azimuth device during a night-time survey in the Northern Hemisphere can be done by rotating the arm 33 until the line L including the two receiver antennas points towards Polaris (the North Star). Alternatively, and more likely, a mechanical device such as a magnetic compass may be used for this orientation of the arm 33.

The arm 33 optionally includes a built-in leveling device 36 such as a bubble-level, as illustrated in FIG. 5B, which allows the arm to be leveled so that the two antennas lie in a local tangent plane.

This apparatus, illustrated in FIG. 5A and 5B, can be a modification of the apparatus given in either FIG. 2A, 2B, 2C or FIG. 3A, 3B, 3C, by incorporating the azimuth indicating device 37 and the leveling device 36 (e.g., a magnetic compass and a bubble-level). The same apparatus can then be used for all methods, which is desirable.

For the modification of the method using an azimuth indicating device, the position of the roving receiver antenna is determined using the known position of the reference receiver antenna, together with the separation distance d, as illustrated in FIG. 5B. The azimuthal angle $\Psi$ is obtained from the azimuth indicating device.

First, the reference receiver antenna position in Cartesian coordinates ($x_1$, $y_1$, $z_1$) is converted into geodetic coordinates ($\text{latitude}_1$, $\text{longitude}_1$, $\text{altitude}_1$) that refer to a particular reference ellipsoid, such as the WGS84 reference ellipsoid used by the GPS system. Standard formulae are available for this conversion. See, for example, the discussion in A. Leick, *GPS Satellite Surveying*, John Wiley & Sons, 1990, pp. 183–191, incorporated by reference herein.

Next, the distance d is resolved into components in the directions of east and north given by $d_{east}$ and $d_{north}$ respectively, using the measurement of azimuthal angle $\Psi$, with $\Psi=0°$ indicating the chosen north direction. If the azimuth indicating device 37 is a magnetic compass, a correction to yield the true azimuth from the magnetic azimuth can be made based on the known magnetic variation at the reference receiver antenna position. The east and north components of the distance d are given by $$d_{east} = d \sin \Psi, \tag{33}$$

$$d_{north} = d \cos \Psi. \tag{34}$$

If the azimuthal angle $\Psi$ is set to either 0° or 90°, by rotating the arm 33 as illustrated in FIG. 5B, the value of $d_{east}$ or $d_{north}$, respectively, will become zero, with a corresponding simplification in the estimation of the DD integers. Such a rotation can be considered as a field procedure associated with DD phase integer determination.

The east and north components of the separation distance d are expressed in meters, and these components must be converted to changes in latitude and longitude, given here in degrees, by using $\Delta$-latitude and $\Delta$-longitude, defined, respectively, by the relations $$\Delta\text{-latitude} = 360 \, d_{north}/2\pi R, \tag{35}$$

$$\Delta\text{-longitude} = 360 \, d_{east}/[2\pi R \cos(\text{latitude}_1)]. \tag{36}$$

Here, the radius of the reference ellipsoid modelling the earth is R. The geodetic coordinates of the roving receiver antenna ($\text{latitude}_2$, $\text{longitude}_2$, $\text{altitude}_2$) are then given in terms of the reference receiver antenna geodetic coordinates by $$\text{latitude}_2 = \text{latitude}_1 + \Delta\text{-latitude}, \tag{37}$$

$$\text{longitude}_2 = \text{longitude}_1 + \Delta\text{-longitude}, \tag{38}$$

$$\text{altitude}_2 = \text{altitude}_1. \tag{39}$$

The altitudes of the roving and reference receiver antennas are the same because the antennas both lie in the local horizon plane by virtue of the leveling device in the apparatus illustrated in FIG. 5B. Next, the Cartesian coordinates ($x_2$, $y_2$, $z_2$) of the roving receiver antenna are obtained from the geodetic coordinates by using standard conversion formulae. See, for example, A. Leick, ibid.

Estimation of the DD phase integers can now be completed by forming estimated theoranges $R_{e;i,j}$, as given in Eq. (8), for the roving receiver antenna from Eqs. (37), (38) and (39), and then forming estimated double-differenced theoretical ranges $\Delta R_{e;i,i';j,j'}$ as given in Eqs. (3)–(5). These theoranges are used to determine the estimated DD integers $N_e$ using Eq. (7) or Eq. (27) or Eq. (31), depending on the choice of type of phase measurements. The correct DD phase integers $N_{i,i';j,j'}$ can be obtained directly from the estimates $N_e$, using the relation $$N_{i,i';j,j'} = \text{floor}[N_e + 0.5]. \tag{40}$$

Here, the floor function rounds the estimate $N_e$ to the nearest (true) integer. As before, this rounding is necessary to account for and remove the effect of measurement noise and residual errors from other sources. For this method, such errors include errors in the measurement of the azimuth of the roving antenna relative to the reference antenna. For example, if a magnetic compass is used to measure azimuth angle, it may be convenient to ignore the variation between magnetic north and true north, if the required correction is sufficiently small, without compromising the determination of the DD phase integers. Another source of error is inaccuracy of the leveling device 36, which results in small differences in height between the antennas of the reference and roving receivers.

After the DD phase integers have been determined and integer initialization has been performed, the antenna of the roving receiver 13 may be moved to other locations and differential positioning may begin. Determination of the second stage errors $E_{(2)}$ can be omitted in this second modification.

In this second modification of the method it is assumed that the antennas lie in a plane tangential to the Earth at the reference receiver location. However, this modification can be extended to allow differences in height between the reference and roving receiver antennas, using the same principles. The height difference of the two receiver antennas would need to be measured and used in the estimation of the DD integers. The described method is simplified by using a leveling device that positions the antennas at approximately the same height above a reference ellipsoid.

The invention provides a method for accurate and rapid determination of differential positions between two or more stations receiving signals from a plurality of satellites. The additional complexity of the receivers, which are part of the apparatus required by the invention, is minimized by use of sets of carrier phase measurements (L1, L2, w, n or general cp) by the invention.

The method of estimating the double-difference (DD) phase integers, using L1 and/or L2 carrier phase measurements uses two stages. For both stages, the position of the reference receiver antenna is unchanged. For the two stages, the roving receiver antenna occupies two positions that are diametrically opposite from each other, and at the same distance d from the reference antenna. The three antenna positions are collinear, and the distance d need not be measured. This allows additional roving receivers to be added to a network of receivers without disturbing differential positioning already established with existing roving receivers. The method combines two sets of estimates of DD phase integers computed with the roving receiver antenna at the two specified locations, such that errors associated with these estimates cancel to yield a correct set of DD phase integers. Only knowledge of the reference receiver's absolute position is required with sufficient accuracy; the position of the roving receiver is not required, and is not computed by the method of estimating the DD integers; and triple-difference processing is not required. This simplifies the method.

Mechanical apparatus can be used to facilitate moving the roving receiver antenna to the required positions for the two stages required by the method. A rigidly fixed arm 33 can be used (FIGS. 3A, 3B, 3C), which has three brackets to which antennas may be attached and detached. Alternatively, the arm 33 may be allowed to rotate through 180°, in which case the roving receiver antenna need not be detached for the second stage measurement; the change in position is accomplished by rotation of the arm.

In a modification of the method, the separation distance d between the reference and roving antennas for the first stage is reduced. This allows the second stage to be eliminated, and the DD phase integers can be correctly determined using only the first stage determination.

In another modification of the method, the distance between the reference and roving receiver antennas is assumed known for the first stage, and the azimuth angle of the roving receiver antenna relative to the reference receiver antenna is determined with any azimuth-indicating device, such as a magnetic compass. The three antennas lie in a local horizon plane tangential to the reference receiver position, which eliminates the need to measure the difference in height between the antennas. A mechanical apparatus incorporating a built-in azimuth device can be used to facilitate the orientation of the roving receiver antenna relative to the reference receiver antenna. This apparatus can be an adaptation of the original apparatus, allowing either method to be chosen for DD phase integer determination. The second stage of DD phase integer estimation, required by the original method, is eliminated. The ability to perform either method, with or without an azimuth-indicating device, is desirable if the azimuth-indicating device is a magnetic compass that will not work near the magnetic poles. The original method, requiring two stages to estimate the DD phase integers, is a truly global method: The method will work correctly at all locations on the Earth's surface.

Because the method of differential positioning uses measurements obtained by double-differencing between satellites and stations, the effects of the receivers' clocks and satellites' clocks cancel so that clock offsets from a reference time system need not be considered in the differential positioning method.

If the P-code signal on L2 is encrypted into a Y-code signal, the method using L2 carrier phases can still be used provided that the receiver is capable of making such phase measurements. Receivers that cross-correlate the L1 and L2 signals in any fashion (with or without use of P-code), or that square the L2 signal in any fashion (with or without use of P-code), are capable of providing suitable L2 carrier phase measurements to be used by the method. For the case in which the squared L2 signal is used, the signal wavelength is halved. Alternatively, during periods of L2 encryption, the method using only the L1 carrier phase measurements can be used.

Figures 6A, 6B:
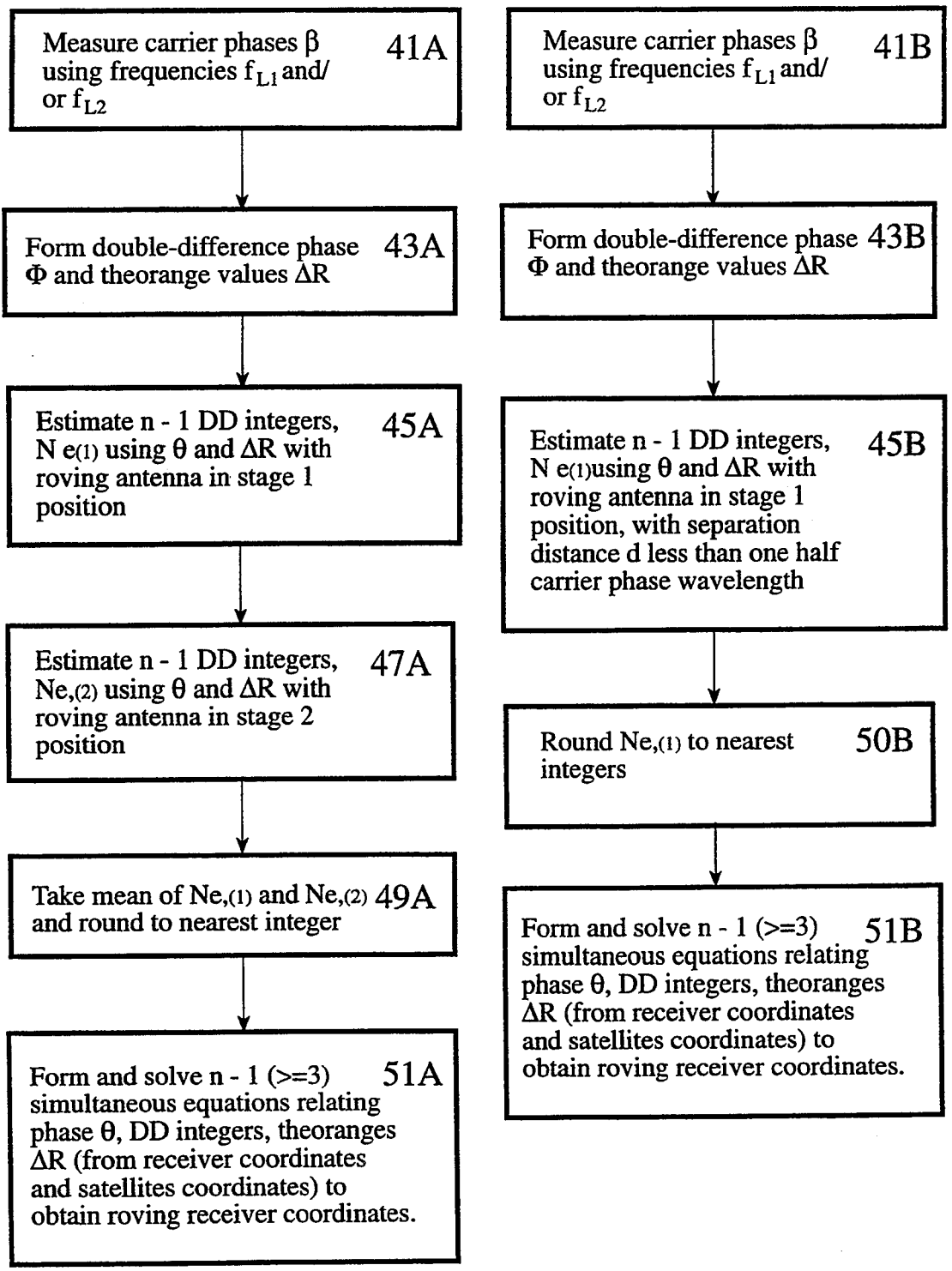
FIGS. 6A, 6B and 6C are flow charts illustrating determination of roving receiver position according to three embodiments of the invention.

The procedure for position determination using the first method, shown as a flow chart in FIG. 6A, begins with measurement of the carrier phase for each of the carrier frequencies $f_{L1}$ and/or $f_{L2}$ for $n \geq 4$ satellites, such as 15, 17, 19, 21 shown schematically in FIG. 1, at each of the reference receiver 14 and the roving receiver 13 (step 41A in FIG. 6A).

Choosing one of the satellites, such as 15, as a base, the double-difference phase $\Phi_{i,i';j,j'}$, and double-difference theoranges $\Delta R_{i,i';j,j'}$ ($i = 1, i' = 2, \ldots n; j = 1, j' = 2$) are formed as in Eqs. (2)–(5) (Step 43A) (Eq. (2) refers to the user of L1 or L2 carrier phase; for other types of phase measurements Eq. (2) can be replaced by Eq. (26) or (30)).

With the reference and roving receiver antennas placed in the positions required for the first stage of the DD initialization process, estimate the $n-1$ DD phase integers $N_{e(1)}$, using Eq. (7) (or Eq. (27) and (31)) dependent on the type of phase measurement), for each of the non-base satellites (e.g., 17, 19, 21 in FIG. 1) and the roving receiver antenna positions (Step 45A).

Next, move the roving receiver antenna through 180° to the position required by the second stage of the DD initialization process, and re-estimate the $n-1$ DD phase integers $N_{e(2)}$, again using Eq. (7) (or equivalent) (Step 47A).

Compute the arithmetic mean of the two sets of estimates to cancel errors in these estimates, and round to the nearest integer by the operations $$N_{i,i';j,j'} = \text{floor}[(N_{e,i,i';j,j';(1)} + N_{e,i,i';j,j';(2)})/2 + 0.5]. \tag{41}$$

This yields the correct set of DD phase integers (Step 49A).

Where n satellites are used for position determination ($n \geq 4$), $n-1$ simultaneous equations given by Eq. (1) (or Eq. (25) or (29) depending on the type of phase measurement) are obtained and solved to estimate the coordinates ($x_{13}, y_{13}, z_{13}$) of the roving receiver antenna, given that the coordinates ($x_{14}, y_{14}, z_{14}$) of the reference receiver antenna are known with sufficient accuracy (Step 51A). If $n = 4$, the number of equations is precisely equal to the number of unknowns (the roving receiver coordinates), and in principle a unique solution of Eq. (1) (or Eq. (25) or (29)) should be obtainable. In practice, the solution obtained for $n = 4$ may be inaccurate because of the presence of other noise and other error sources. If $n > 4$, the system of Eqs. (1) (or equivalent) is overdetermined, and approximate equations must be sought based on some error criterion.

One such criterion minimizes the least squares error sum $$\epsilon = \sum_{i'=2}^{n} [\Phi_{i,i';j,j'} + \Delta R_{i,i';j,j'} - N_{i,i';j,j'}]^2, \tag{42}$$

where the receiver numbers j and j' and the satellite number i are fixed. A second approach, which is statistically more optimum, is Kalman filtering. A third approach, which is numerically more stable, is use of square root information filtering. These approaches are discussed by G. Bierman in *Factorization Methods for Discrete Sequential Estimation*, Academic Press, 1977, pp. 13–31 and 68–112, incorporated by reference herein.

In a second method of the invention, shown as a flow chart in FIG. 6B, the distance d between the reference and roving receiver antennas is less than half the wavelength of the carrier phase measurements. Steps 41B, 43B and 45B are analogous to the steps 41A, 43A and 45A, respectively, of FIG. 6A. Comet DD phase integers are obtained in Step 50B, using the relations $$N_{i,i';j,j'} = \text{floor}[N_{e,(1)} + 0.5]. \tag{43}$$

For this situation, the second stage measurements of step 47A in FIG. 6A can be omitted.

Figure 6C:
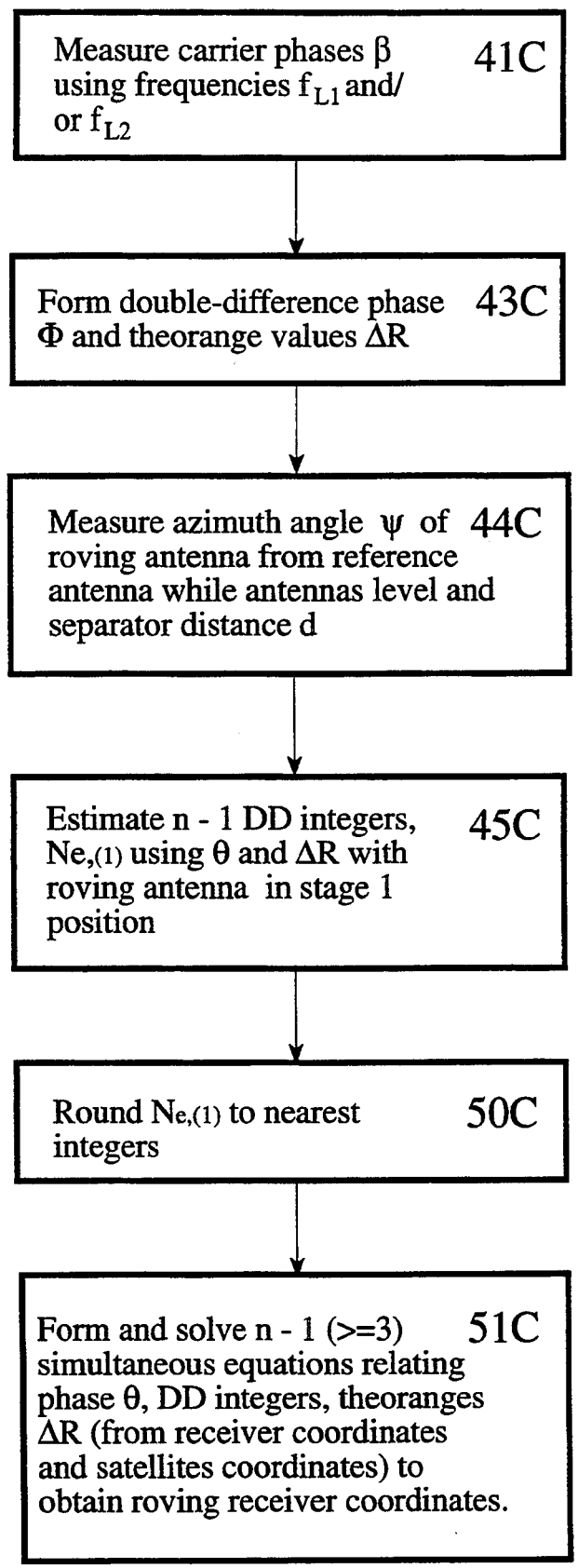

In a third method, shown in flow chart form in FIG. 6C, an azimuth-indicating device is used to determine the azimuthal angle $\Psi$ of the line L (FIG. 5B) containing the roving receiver antenna and the reference receiver antenna (step 44C). The distance d between these two antennas is also measured in step 44C. Steps 41C, 43C, 45C, 50C and 51C are analogous to steps 41B, 43B, 45B, 50B and 51B, respectively, of FIG. 6B. Equation (43) is again used to determine the correct DD phase integers in step 50C.

The Remondi antenna swap method is superficially similar to the first embodiment of the invention and is also used for determining phase integer ambiguities. In the Remondi and Hoffmann-Wellenhof article presented at the GPS Workshop in April 1988, op. cit., the authors describe a triple difference approach used by the antenna swap method. A triple difference equation is formed by taking the difference of two double difference equations, formed at two distinct epochs in time: at t=t1, when the two antennas are in their original positions; and at t=t2, when the two antenna positions have been exchanged. The following discussion summarizes this triple difference method, using a nomenclature similar to that used to describe the invention above.

Double difference equations for satellites i and i' and for receivers j and j' are formed at each of the times t=t1 and t=t2, where the double difference phase integer N is unchanged as the satellites are continuously tracked.

$$\Phi_{i,i';j,j';Lk;t1} = -\{R_{i(t1),j(t1)} - R_{i'(t1),j(t1)} - R_{i(t1),j'(t1)} + R_{i'(t1),j'(t1)}\}/\lambda_{Lk} + N_{i,i';j,j'}, \quad (44)$$

$$\Phi_{i,i';j,j';Lk;t2} = -\{R_{i(t2),j'(t1)} - R_{i'(t2),j'(t1)} - R_{i(t2),j(t1)} + R_{i'(t2),j(t1)}\}/\lambda_{Lk} + N_{i,i';j,j'}. \quad (45)$$

In Eq. (45), the range terms R refer to ranges from the original positions of the receivers j and j' at time t1, to the positions of the satellite i and i' at time t2. For example, the difference between the terms $R_{i(t1),j(t1)}$ and $R_{i(t2),j(t1)}$ reflects movement only of the satellite i between time t1 and time t2, with no change in the position of receiver j. Exchanging the two antenna positions causes an exchange of the subscripts j and j', and conversely. Subtraction of Eq. (44) from Eq. (45) eliminates the phase integer ambiguities and produces the triple difference equation $$\Phi_{i,i';j,j';Lk;t2} - \Phi_{i,i';j,j';Lk;t1} = \quad (46)$$

$$-\{R_{i(t2),j'(t1)} - R_{i'(t2),j'(t1)} - R_{i(t2),j(t1)} + R_{i'(t2),j(t1)} -$$

$$R_{i(t1),j(t1)} + R_{i'(t1),j(t1)} + R_{i(t1),j'(t1)} - R_{i'(t1),j'(t1)}\}/\lambda_{Lk}.$$

In Eq. (46), corresponding pairs of range terms, such as $R_{i(t1),j(t1)}$ and $R_{i(t2),j(t1)}$, sum together and do not cancel in pairs. The authors note that this is an advantage of the antenna exchange procedure vis-a-vis formation of a triple difference equation without antenna exchange, where the corresponding range terms cancel in pairs. The triple difference equations (46) with antenna exchange are then solved to determine the positions of the two antennas (i.e., the baseline vector), using a knowledge of the reference receiver position at time t=t1. The authors assert that, once the baseline solution is obtained, the values of the phase integer ambiguities can be found using the double difference equations (44) or (45) at time t1 or t2, respectively.

By contrast, the first embodiment of the invention disclosed here relies solely upon double difference equations, formed at times t1 and t2, and does not rely upon a triple difference equation for any purpose. The antenna exchange method and the method of the first embodiment thus differ in the complexity of mathematical analysis required. The first embodiment does not require determination of the baseline vector, which is required as an intermediate step in the antenna exchange method.

Further, as noted earlier, in the Remondi antenna exchange method, the reference receiver antenna and roving receiver antenna are both moved, by exchange with each other, but no new antenna position is created. In the first embodiment of the invention disclosed here, only the roving receiver antenna is moved, and a new antenna position (the second roving receiver antenna position) is thereby created. Thus, the antenna exchange method and the first embodiment differ at the operational level as well as at the mathematical level.

We claim:

1. A method for determining and removing the phase integer ambiguities associated with determination of position of a receiver that is part of a Satellite Positioning System, the method comprising the steps of:

(1) providing a reference receiver and antenna, denoted receiver number 1, whose antenna position r(ref) is known with predetermined accuracy, at a sequence of predetermined times;

(2) providing a roving receiver and antenna, denoted receiver number 2, with a first roving receiver antenna position r(rov, +d, L) that is displaced from the reference receiver antenna position by a distance +d in a first direction along a selected line L also containing the reference receiver antenna position, where d need not be determined;

(3) providing a plurality of n satellites (n≧4), numbered i=1, 2, . . . , n, at predetermined heights above the Earth's surface, where each satellite transmits a predetermined signal at a predetermined sequence of times at each of at least two carrier signal frequencies $f = f_{L1}$ and $f = f_{L2}$;

(4) determining an effective signal frequency $f_{cp} = \alpha_1 f_{L1} + \alpha_2 f_{L2} = c/\lambda_{cp}$, expressed as a selected linear combination of the two carrier frequencies $f_{L1} = c/\lambda_{L1}$ and $f_{L2} = c/\lambda_{L2}$, for the Satellite Positioning System, where c is the velocity of light and $\lambda_{cp}$ is the corresponding effective wavelength;

(5) determining a phase integer estimate $N_{e;i,i';j,j'}(1)$ for the roving receiver located at a first roving receiver antenna position r(rov, +d, L), for satellites number i and i' and receivers number j and j' from the relation $$N_{e;i,i';j,j'}(1) = \Delta R_{i,i';j,j'}(1)/\lambda_{cp} + \Phi_{i,i';j,j';cp}(1),$$

where $\Delta R_{i,i';j,j'}(1)$ is a double difference range value defined by the relation $$\Delta R_{i,i';j,j'}(1) = (R_{i,j}(1) - R_{i',j}(1)) - (R_{i,j'}(1) - R_{i',j'}(1)),$$

and $R_{i,j}(1)$ is the theoretical range or distance from receiver number j to satellite number i for the first roving receiver antenna position, assuming that $d \approx 0$ for this determination, and $\Phi_{i,i';j,j';cp}(1)$ is a phase variable determined by the relation $$\Phi_{i,i';j,j';cp}(1) = [\beta_{i,j;cp}(1) - \beta_{i',j;cp}(1)] - [\beta_{i,j';cp}(1) - \beta_{i',j';cp}(1)],$$

where $\beta_{i,j;cp}(1)$ is an effective phase, measured from satellite number i to receiver number j of a carrier signal with effective frequency $f_{cp}$;

(6) determining a phase integer estimate $N_{e;i,i';j,j'}(2)$ for the roving receiver located at a second roving receiver antenna position r(rov, −d, L), for satellites number i and i' and receivers number j and j' from the relation $$N_{e,i,i';j,j'}(2) = \Delta R_{i,i';j,j'}(2)/\lambda_{cp} + \Phi_{i,i';j,j';cp}(2),$$

where $\Delta R_{i,i';j,j'}(1)$ is a double difference range value defined by the relation $$\Delta R_{i,i';j,j'}(2) = (R_{i,j}(2) - R_{i',j}(2)) - (R_{i,j'}(2) - R_{i',j'}(2)),$$

and $R_{i,j}(2)$ is the theoretical range or distance from receiver number j to satellite number i for the first roving receiver antenna position, assuming that d=0 for this determination, and $\Phi_{i,i';j,j';cp}(2)$ is a phase variable determined by the relation $$\Phi_{i,i';j,j';cp}(2) = [\beta_{i,j;cp}(2) - \beta_{i',j;cp}(2)] - [\beta_{i,j';cp}(2) - \beta_{i',j';cp}(2)],$$

where $\beta_{i,j;cp}(2)$ is an effective phase, measured from satellite number i to receiver number j of a carrier signal with effective frequency $f_{cp}$; and (7) determining the desired phase integers $N_{i,i';j,j'}$ for the reference and roving receiver antennas by the relations $$N_{i,i';j,j'} = \text{floor}[(N_{e;i,i';j,j'}(1) + N_{e;i,i';j,j'}(2))/2 + 0.5].$$

2. A method for determining and removing the phase integer ambiguities associated with determination of position of a receiver that is part of a Satellite Positioning System, the method comprising the steps of:

(1) providing a reference receiver and antenna, denoted receiver number 1, whose antenna position r(ref) is known with predetermined accuracy, at a sequence of predetermined times;

(2) providing a roving receiver and antenna, denoted receiver number 2, with a roving receiver antenna position r(rov, d, L) that is displaced from the reference receiver antenna position by a distance d in a first direction along a selected line L also containing the reference receiver antenna position, where d need not be determined;

(3) providing a plurality of n satellites (n≧4), numbered i=1, 2, . . . , n, at predetermined heights above the Earth's surface, where each satellite transmits a predetermined signal at a predetermined sequence of times at each of at least two carrier signal frequencies $f = f_{L1}$ and $f = f_{L2}$;

(4) determining an effective signal frequency $f_{cp} = \alpha_1 f_{L1} + \alpha_2 f_{L2} = c/\lambda_{cp}$, expressed as a selected linear combination of the two carrier frequencies $f_{L1} = c/\lambda_{L1}$ and $f_{L2} = c/\lambda_{L2}$, for the Satellite Positioning System, where c is the velocity of light, $\lambda_{cp}$ is the corresponding effective wavelength and the distance d is less than $\lambda_{cp}/2$;

(5) determining a phase integer estimate $N_{e;i,i';j,j'}$ for the roving receiver located at the roving receiver antenna position r(rov, d, L), for satellites number i and i' and receivers number j and j' from the relation $$N_{e,i,i';j,j'} = \Delta R_{i,i';j,j'}/\lambda_{cp} + \Phi_{i,i';j,j';cp},$$

where $\Delta R_{i,i';j,j'}(1)$ is a double difference range value defined by the relation $$\Delta R_{i,i';j,j'} = (R_{i,j} - R_{i',j}) - (R_{i,j'} - R_{i',j'}),$$

and $R_{i,j}$ is the theoretical range or distance from receiver number j to satellite number i for the first roving receiver antenna position, assuming that $d \approx 0$ for this determination, and $\Phi_{i,i';j,j';cp}$ is a phase variable determined by the relation $$\Phi_{i,i';j,j';cp} = [\beta_{i,j;cp} - \beta_{i',j;cp}] - [\beta_{i,j';cp} - \beta_{i',j';cp}],$$

where $\beta_{i,j;cp}$ is an effective phase, measured from satellite number i to receiver number j of a carrier signal with effective frequency $f_{cp}$; and (6) determining the desired phase integers $N_{i,i';j,j'}$ for the reference and roving receiver antennas by the relations $$N_{i,i';j,j'} = \text{floor}[N_{e;i,i';j,j'} + 0.5].$$

3. A method for determining and removing the phase integer ambiguities associated with determination of position of a receiver that is part of a Satellite Positioning System, the method comprising the steps of:

(1) providing a reference receiver and antenna, denoted receiver number 1, whose antenna position r(ref) is known with predetermined accuracy, at a sequence of m predetermined times;

(2) providing a roving receiver and antenna, denoted receiver number 2, whose antenna position r(rov, d, L) is displaced from the reference receiver antenna position by a known distance d in a first direction along a selected line L containing the reference receiver antenna position;

(3) determining the azimuthal angle $\Psi$ of the line L with respect to a chosen north direction;

(4) from the known geodetic coordinates (latitude$_1$, longitude$_1$, altitude$_1$) of the reference receiver antenna position, determining the geodetic coordinates of the roving receiver antenna (latitude$_2$, longitude$_2$, altitude$_2$) according to the relations latitude$_2$ = latitude$_1$ + (360° d cos $\Psi$)/(2$\pi R$), longitude$_2$ = longitude$_1$ + (360° d sin $\Psi$)/(2$\pi R$ cos(latitude$_1$)), altitude$_2$ = altitude$_1$;

(5) providing a plurality of n satellites (n≧4), numbered i=1,2, . . . , n, at predetermined heights above the Earth's surface, where each satellite transmits a predetermined signal at a predetermined sequence of times at each of at least two carrier signal frequencies $f = f_{L1}$ and $f = f_{L2}$;

(6) determining an effective frequency $f_{cp} = \alpha_1 f_{L1} + \alpha_2 f_{L2} = c/\lambda_{cp}$, expressed as a selected linear combination of the two carrier frequencies $f_{L1} = c/\lambda_{L1}$ and $f_{L2} = c/\lambda_{L2}$, for the Satellite Positioning System, where c is the velocity of light and $\lambda_{cp}$ is the corresponding effective wavelength;

(7) determining a phase integer estimate $N_{e;i,i';j,j'}$ for the roving receiver located at the roving receiver antenna position r(rov, d, L), for satellites number i and i' and receivers number j and j' from the relation $$N_{e;i,i';j,j'} = \Delta R_{i,i';j,j'}/\lambda_{cp} + \Phi_{i,i';j,j';cp},$$

where $\Delta R_{i,i';j,j'}(1)$ is a double difference range value defined by the relation $$\Delta R_{i,i';j,j'} = (R_{i,j} - R_{i',j}) - (R_{i,j'} - R_{i',j'}),$$

and $R_{i,j}$ is the theoretical range or distance from receiver number j to satellite number i for the roving receiver antenna position r(rov, d, L), and $\Phi_{i,i';j,j';cp}$ is a phase variable determined by the relation $$\Phi_{i,i';j,j';cp} = [\beta_{i,j;cp} - \beta_{i',j;cp}] - [\beta_{i,j';cp} - \beta_{i',j';cp}],$$

where $\beta_{i,j;cp}$ is an effective phase, measured from satellite number i to receiver number j of a carrier signal with effective frequency $f_{cp}$; and (8) determining the desired phase integers $N_{i,i';j,j'}$ for the reference and roving receiver antennas by the relations $$N_{i,i';j,j'} = \text{floor}[N_{e;i,i';j,j'} + 0.5].$$

4. A method for determining and removing the phase integer ambiguities associated with determination of position of a receiver that is part of a Satellite Positioning System, the method comprising the steps of:

(1) providing a reference receiver and antenna, denoted receiver number 1, whose antenna position r(ref) is known with predetermined accuracy, at a sequence of m predetermined times;

(2) providing a roving receiver and antenna, denoted receiver number 2, whose antenna position r(rov, +d, L) is displaced from the reference receiver antenna position by an arbitrary distance +d in a first direction along a selected line L also containing the reference receiver antenna position, where d need not be determined;

(3) providing a plurality of n satellites (n≧4), numbered i = 1,2, ..., n, at predetermined heights above the Earth's surface, where each satellite transmits a predetermined signal at a predetermined sequence of times at each of at least two carrier signal frequencies $f = f_{L1}$ and $f = f_{L2}$;

(4) determining an effective signal frequency $f_{cp} = \alpha_1 f_{L1} + \alpha_2 f_{L2} = c/\lambda_{cp}$, expressed as a selected linear combination of the two carrier frequencies $f_{L1} = c/\lambda_{L1}$ and $f_{L2} = c/\lambda_{L2}$, for the Satellite Positioning System, where c is the velocity of light and $\lambda_{cp}$ is the corresponding effective wavelength;

(5) performing steps (6)–(11) for the roving receiver located at a first roving receiver antenna position r(rov, +d, L);

(6) providing a plurality of n theoretical distance values $R_{1,1}, R_{2,1}, \ldots, R_{n,1}$ from each of the n satellites to the roving receiver antenna at the sequence of predetermined times, where $R_{I,J}$ is the distance between satellite number I, with Cartesian coordinates $(x_I, y_I, z_I)$, and receiver antenna number J, with coordinates $(x_J, y_J, z_J)$ (I = 1, 2, ..., n; J = 1, 2), given by $R_{I,J} = [(x_I - x_J)^2 + (y_I - y_J)^2 + (z_I - z_J)^2]^{\frac{1}{2}}$, where each theoretical distance value is determined from a knowledge of the position of a satellite and of an estimate of a position of the roving receiver antenna, assuming that $d \approx 0$ for this determination;

(7) determining a plurality of n theoretical distance values $R_{1,2}, R_{2,2}, \ldots, R_{n,2}$ from each of the satellites to the reference receiver antenna at the sequence of predetermined times, where each theoretical distance value is determined from a knowledge of the position of a satellite and of the position of the reference receiver antenna, where the position of the reference receiver antenna is known with sufficient accuracy at each of the predetermined sequence of times;

(8) forming theoretical range double difference values $\Delta R_{i,i';j,j'}(1)$ (i,i' = 1,2, ..., n; i≠i'; j,j' = 1,2; j≠j') for the reference and roving receiver antenna positions, defined by the relations $$\Delta R_{i,i';j,j'}(1) = (R_{i,j}(1) - R_{i',j}(1)) - (R_{i,j'}(1) - R_{i',j'}(1))$$

for the pair of satellites number i and i' and the pair of receiver antennas number j and j';

(9) measuring the effective phase $\beta_{ij;cp}(1)$ from satellite number i of a carrier signal with effective frequency $f = f_{cp}$ received at receiver antenna number j (i = 1,2, ..., n; j = 1, 2);

(10) forming double difference phase variables $$\Phi_{i,i';j,j';cp}(1) = [\beta_{i,j;cp}(1) - \beta_{i',j;cp}(1)] - [\beta_{i,j';cp}(1) - \beta_{i',j';cp}(1)]$$

for the satellites number i and i' and the receiver antennas number j and j', using the effective signal frequency $f = f_{cp}$;

(11) determining phase integer estimates $N_{e;i,i';j,j'}$ by the relations $$N_{e;i,i';j,j'}(1) = \Delta R_{i,i';j,j'}(1)/\lambda_{cp} + \Phi_{i,i';j,j';cp}(1);$$

(12) performing steps (6)–(11) for the roving receiver antenna located at a second roving receiver antenna position r(rov, −d, L) that also lies on the line L, where the reference receiver antenna position lies between, and equidistant from, the first and second roving receiver antenna positions on the line L, to obtain the double difference range values $\Delta R_{i,i';j,j'}(2)$ defined by $$\Delta R_{i,i';j,j'}(2) = (R_{i,j}(2) - R_{i',j}(2)) - (R_{i,j'}(2) - R_{i',j'}(2)),$$

measured carrier phase variables $\beta_{i,j;cp}(2)$, double difference phase variables $\Phi_{i,i';j,j';cp}(2)$ defined by $$\Phi_{i,i';j,j';cp}(2) = [\beta_{i,j;cp}(2) - \beta_{i',j;cp}(2)] - [\beta_{i,j';cp}(2) - \beta_{i',j';cp}(2)],$$

and phase integer estimates $N_{e;i,i';j,j'}(2)$ given by $$N_{e;i,i';j,j'}(2) = \Delta R_{i,i';j,j';cp}(2)/\lambda_{cp} + \Phi_{i,i';j,j';cp}(2); \text{ and}$$

(13) determining the desired phase integers for the reference and roving receiver antennas by the relations $$N_{i,i';j,j'} = \text{floor}[(N_{e;i,i';j,j'}(1) + N_{e;i,i';j,j'}(2))/2 + 0.5].$$

5. The method of claim 4, further comprising the step of choosing said integer n equal to four.

6. The method of claim 4, further comprising the step of

(14) solving the n − 1 simultaneous equations given by $$\Phi_{i,i';1,2} = -\Delta R_{i,i';1,2}/\lambda_{cp} + N_{i,i';1,2}, (i \text{ and } i' = 1,2, \ldots, n; i \neq i')$$

to obtain position coordinates (x₂,y₂,z₂) of a roving receiver antenna located at an arbitrary position, when the coordinates (x₁,y₁,z₁) of the reference receiver antenna are known with sufficient accuracy.

7. The method of claim 4, further comprising the step of choosing said effective frequency, and of said corresponding effective phases $\beta_{i,i';j,j';cp}$, drawn from the group consisting of the L1 carrier frequency $f_{L1}$, the L2 carrier frequency $f_{L2}$, the wide lane frequency $f_w = f_{L1} - f_{L2}$, and the narrow lane frequency $f_n = f_{L1} + f_{L2}$.

8. A method for determining and removing the phase integer ambiguities associated with determination of position of a receiver that is part of a Satellite Positioning System, the method comprising the steps of:

(1) providing a reference receiver and antenna, denoted receiver number 1, whose antenna position r(ref) is known with predetermined accuracy, at a sequence of m predetermined times;

(2) providing a roving receiver and antenna, denoted receiver number 2, whose antenna position r(rov, d, L) is displaced from the reference receiver antenna position by a distance d in a first direction along a selected line L also containing the reference receiver antenna position, where d need not be determined;

(3) providing a plurality of n satellites (n≥4), numbered i=1, 2, ..., n, at predetermined heights above the Earth's surface, where each satellite transmits a predetermined signal at a predetermined sequence of times at each of at least two carrier signal frequencies $f = f_{L1}$ and $f = f_{L2}$;

(4) determining an effective frequency $f_{cp} = \alpha_1 f_{L1} + \alpha_2 f_{L2} = c/\lambda_{cp}$, expressed as a selected linear combination of the two carrier frequencies $f_{L1} = c/\lambda_{L1}$ and $f_{L2} = c/\lambda_{L2}$ for the Satellite Positioning System, where c is the velocity of light, where $\lambda_{cp}$ is the corresponding effective wavelength, and where the distance d is less than half the effective wavelength (d < $\lambda_{cp}$/2);

(5) determining a plurality of n theoretical distance values $R_{1,1}, R_{2,1}, \ldots, R_{n,1}$ from each of the n satellites to the roving receiver antenna at the sequence of predetermined times, where $R_{I,J}$ is the distance between satellite number I, with Cartesian coordinates $(x_I, y_I, z_I)$, and receiver antenna number J, with coordinates $(x_J, y_J, z_J)$ (I=1, 2, ..., n; J=1, 2), given by $R_{I,J} = [(x_I - x_J)^2 + (y_I - y_J)^2 + (z_I - z_J)^2]^{\frac{1}{2}}$, where each theoretical distance value is determined from a knowledge of the position of a satellite and an estimate of a position of the roving receiver antenna, assuming that d ≈ 0 for this determination;

(6) determining a plurality of n theoretical distance values $R_{1,2}, R_{2,2}, \ldots, R_{n,2}$ from each of the satellite to the reference receiver antenna at the sequence of predetermined times, where each theoretical distance value is determined from a knowledge of the position of a satellite and of the position of the reference receiver antenna, where the position of the reference receiver antenna is known with sufficient accuracy at each of the predetermined sequence of times;

(7) forming theoretical range double difference values $\Delta R_{i,i';j,j'}$ (i,i'=1,2, ..., n; i≠i'; j,j'=1,2; j≠j') for the reference and roving receiver antenna positions, defined by the relations $$\Delta R_{i,i';j,j'} = (R_{i,j} - R_{i',j}) - (R_{i,j'} - R_{i',j'})$$

for the pair of satellites number i and i' and the pair of receiver antennas number j and j';

(8) measuring the effective phase $\beta_{i,j;cp}$ from satellite number i of a carrier signal with effective frequency $f = f_{cp}$ received at receiver antenna number j (i = 1,2, ..., n; j=1, 2);

(9) forming double difference phase variables $$\Phi_{i,i';j,j';cp} = [\beta_{i,j;cp} - \beta_{i',j;cp}] - [\beta_{i,j';cp} - \beta_{i',j';cp}]$$

for the satellites number i and i' and the receiver antennas number j and j', using the effective signal frequency $f = f_{cp}$;

(10) determining phase integer estimates $N_{e;i,i';j,j'}$ by the relations $$N_{e;i,i';j,j'} = \Delta R_{i,i';j,j'}/\lambda_{cp} + \Phi_{i,i';j,j';cp};$$ and

(11) determining the desired phase integers for the reference and roving receiver antennas by the relations $$N_{i,i';j,j'} = \text{floor}[N_{e;i,i';j,j'} + 0.5].$$

9. The method of claim 8, further comprising the step of choosing said integer n equal to four.

10. The method of claim 8, further comprising the step of

(12) solving the n−1 simultaneous equations given by $$\Phi_{i,i';1,2} = -\Delta R_{i,i';1,2}/\lambda_{cp} + N_{i,i';1,2}, \ (i \text{ and } i' = 1,2, \ldots, n; \ i \neq i')$$

to obtain position coordinates (x₂,y₂,z₂) of a roving receiver antenna located at an arbitrary position, when the coordinates (x₁,y₁,z₁) of the reference receiver antenna are known with sufficient accuracy.

11. The method of claim 8, further comprising the step of choosing said effective frequency, and of said corresponding effective phases $\beta_{i,i';j,j';cp}$, drawn from the group consisting of the L1 carrier frequency $f_{L1}$, the L2 carrier frequency $f_{L2}$, the wide lane frequency $f_w = f_{L1} - f_{L2}$, and the narrow lane frequency $f_n = f_{L1} + f_{L2}$.

12. A method for determining and removing the phase integer ambiguities associated with determination of position of a receiver that is part of a Satellite Positioning System, the method comprising the steps of:

(1) providing a reference receiver and antenna, denoted receiver number 1, whose antenna position r(ref) is known with predetermined accuracy, at a sequence of m predetermined times;

(2) providing a roving receiver and antenna, denoted receiver number 2, whose antenna position r(rov, d, L) is displaced from the reference receiver antenna position by a known distance d in a first direction along a selected line L containing the reference receiver antenna position;

(3) determining the azimuthal angle Ψ of the line L with respect to a chosen north direction;

(4) from the known geodetic coordinates (latitude₁, longitude₁, altitude₁) of the reference receiver antenna position, determining the geodetic coordinates of the roving receiver antenna (latitude₂, longitude₂, altitude₂) according to the relations $$\text{latitude}_2 = \text{latitude}_1 + (360° \ d \cos \Psi)/(2\pi R),$$

longitude$_2$=longitude$_1$+(360° d sin Ψ)/(2πR cos(latitude$_1$)), altitude$_2$=altitude$_1$;

(5) providing a plurality of n satellites (n≥4), numbered i=1, 2, ..., n, at predetermined heights above the Earth's surface, where each satellite transmits a predetermined signal at a predetermined sequence of times at each of at least two carrier signal frequencies f=f$_{L1}$ and f=f$_{L2}$;

(6) determining an effective frequency f$_{cp}$=α$_1$f$_{L1}$+α$_2$f$_{L2}$=c/λ$_{cp}$, expressed as a selected linear combination of the two carrier frequencies f$_{L1}$=c/λ$_{L1}$ and f$_{L2}$=c/λ$_{L2}$, for the Satellite Positioning System, where c is the velocity of light and λ$_{cp}$ is the corresponding effective wavelength;

(7) determining a plurality of n theoretical distance values R$_{1,2}$, R$_{2,2}$, ..., R$_{n,2}$ from each of the satellites to the reference receiver antenna at the sequence of predetermined times, where each theoretical distance value is determined from a knowledge of the position of a satellite and of the position of the reference receiver antenna, where the position of the reference receiver antenna is known with sufficient accuracy at each of the predetermined sequence of times;

(8) determining a plurality of n theoretical distance values R$_{1,1}$, R$_{2,1}$, ..., R$_{n,1}$ from each of the n satellites to the roving receiver antenna at the sequence of predetermined times, using the geodetic coordinates for this antenna determined in step (4), where R$_{I,J}$ is the distance between satellite number I, with Cartesian coordinates (x$_I$,y$_I$,z$_I$), and receiver antenna number J, with coordinates (x$_J$,y$_J$,z$_J$) (I=1, 2, ..., n; J=1, 2), given by R$_{I,J}$=[(x$_I$−x$_J$)$^2$+(y$_I$−y$_J$)$^2$+(z$_I$−z$_J$)$^2$]$^{\frac{1}{2}}$;

(9) forming theoretical range double difference values ΔR$_{i,i';j,j'}$(i,i'=1,2, ..., n; i≠i'; j,j'=1,2; j≠j') for the reference and roving receiver antenna positions, defined by the relations $$\Delta R_{i,i';j,j'}=(R_{i,j}-R_{i',j})-(R_{i,j'}-R_{i',j'})$$

for the pair of satellites number i and i' and the pair of receiver antennas number j and j';

(10) measuring the effective phase β$_{ij;cp}$ from satellite number i of a signal with effective frequency f=f$_{cp}$ received at receiver antenna number j (i=1,2, ..., n; j=1, 2);

(11) forming double difference phase variables $$\Phi_{i,i';j,j';cp}=[\beta_{i,j;cp}-\beta_{i',j;cp}]-[\beta_{i,j';cp}-\beta_{i',j';cp}]$$

for the satellites number i and i' and the receiver antennas number j and j', using the effective signal frequency f=f$_{cp}$;

(12) determining phase integer estimates N$_{e;i,i';j,j'}$ by the relations $$N_{e;i,i';j,j'}=\Delta R_{i,i';j,j'}/\lambda_{cp}+\Phi_{i,i';j,j';cp};\text{ and}$$

(13) determining the desired phase integers for the reference and roving receiver antennas by the relations $$N_{i,i';j,j'}=\text{floor}[N_{e;i,i';j,j'}+0.5].$$

13. The method of claim 12, further comprising the step of choosing said integer n equal to four.

14. The method of claim 12, further comprising the step of

(13) solving the n−1 simultaneous equations given by $$\Phi_{i,i';1,2}=-\Delta R_{i,i';1,2}/\lambda_{cp}+N_{i,i';1,2}, (i \text{ and } i'=1,2,...,n; i\neq i')$$

to obtain position coordinates (x$_2$,y$_2$,z$_2$) of a roving receiver antenna located at an arbitrary position, when the coordinates (x$_1$,y$_1$,z$_1$) of the reference receiver antenna are known with sufficient accuracy.

15. The method of claim 12, further comprising the step of choosing said effective frequency, and of said corresponding phases β$_{i,i';j,j';cp}$, drawn from the group consisting of the L1 carrier frequency f$_{L1}$, the L2 carrier frequency f$_{L2}$, the wide lane frequency f$_w$=f$_{L1}$−f$_{L2}$, and the narrow lane frequency f$_n$=f$_{L1}$+f$_{L2}$.

16. Apparatus for determining and removing the phase integer ambiguities associated with determination of position of a receiver that is part of a Satellite Positioning System (SPS), the apparatus comprising:

a reference receiver and associated antenna for receiving SPS signals from a plurality of n satellites (n≥4), numbered i=1, 2, ..., n, that are part of the SPS, where the position of the reference receiver antenna is known with sufficient accuracy;

a roving receiver and associated antenna for receiving SPS signals from the plurality of n satellites that are part of the SPS, where each satellite transmits a predetermined signal at a predetermined sequence of times at each of at least two carrier signal frequencies f$_{L1}$=c/λ$_{L1}$ and f$_{L2}$=c/λ$_{L2}$, where c is the velocity of light;

antenna positioning means for positioning the roving receiver antenna at a first selected position and then at a second selected position on a selected line containing the reference receiver antenna, where the reference receiver antenna lies between and at a distance d from the first and the second selected roving receiver antenna positions, where d need not be determined;

signal processing means, connected to the reference receiver antenna and to the roving receiver antenna:

(1) for determining an effective frequency f$_{cp}$=α$_1$f$_{L1}$+α$_2$ f$_{L2}$=c/α$_{cp}$, expressed as a selected linear combination of the two carrier frequencies f$_{L1}$ and f$_{L2}$, for the Satellite Positioning System, where λ$_{cp}$ is the corresponding effective wavelength;

(2) for receiving the SPS signals received by the reference receiver antenna and by the roving receiver antenna at the first selected position and the second selected position;

(3) for determining a plurality of n theoretical distance values R$_{1,1}$, R$_{2,1}$, ..., R$_{n,1}$ from each of the n satellites to the roving receiver antenna at the sequence of predetermined times, where R$_{I,J}$ is the distance between satellite number I, with Cartesian coordinates (x$_I$,y$_I$,z$_I$), and receiver antenna number J, with coordinates (x$_J$,y$_J$,z$_J$) (I=1, 2, ..., n; J=1, 2), given by R$_{I,J}$=[(x$_I$−x$_J$)$^2$+(y$_I$−y$_J$)$^2$+(z$_I$−z$_J$)$^2$]$^{\frac{1}{2}}$, where each theoretical distance value is determined from a knowledge of the position of a satellite and of an estimate of a position of the roving receiver antenna, assuming that $d \approx 0$ for this determination;

(4) for determining a plurality of n theoretical distance values $R_{1,2}, R_{2,2}, \ldots, R_{n,2}$ from each of the satellites to the reference receiver antenna at the sequence of predetermined times, where each theoretical distance value is determined from a knowledge of the position of a satellite and of the position of the reference receiver antenna, where the position of the reference receiver antenna is known with sufficient accuracy at each of the predetermined sequence of times;

(5) for forming theoretical range double difference values $\Delta R_{i,i';j,j'}(1)$ ($i,i'=1,2,\ldots, n; i \neq i'; j,j'=1,2; j \neq j'$) for the reference and roving receiver antenna positions, defined by the relations $$\Delta R_{i,i';j,j'}(1)=(R_{i,j}(1)-R_{i',j}(1))-(R_{i,j'}(1)-R_{i',j'}(1))$$

for the pair of satellites number i and i' and the pair of receiver antennas number j and j', assuming that $d \approx 0$ for this determination;

(6) for measuring the effective phase $\beta_{i,j;cp}(1)$ from satellite number i of a carrier signal with effective frequency $f=f_{cp}$ received at receiver antenna number j ($i=1,2,\ldots, n; j=1, 2$);

(7) for forming double difference phase variables $$\Phi_{i,i';j,j';cp}(1)=[\beta_{i,j;cp}(1)-\beta_{i',j;cp}(1)]-[\beta_{i,j';cp}(1)-\beta_{i',j';cp}(1)]$$

for the satellites number i and i' and the receiver antennas number j and j', using the effective signal frequency $f=f_{cp}$;

(8) for determining phase integer estimates $N_{e;i,i';j,j'}$ by the relations $$N_{e;i,i';j,j'}(1)=\Delta R_{i,i';j,j'}(1)/\lambda_{cp}+\Phi_{i,i';j,j';cp}(1);$$

(9) for performing steps (2)–(8) for the roving receiver antenna located at a second roving receiver antenna position r(rov, −d, L) that also lies on the line L, where the reference receiver antenna position lies between, and equidistant from, the first and second roving receiver antenna positions on the line L, to obtain the double difference range values $\Delta R_{i,i';j,j'}(2)$ defined by $$\Delta R_{i,i';j,j'}(2)=(R_{i,j}(2)-R_{i',j}(2))-(R_{i,j'}(2)-R_{i',j'}(2)),$$

measured carrier phase variables $\beta_{i,j;cp}(2)$, double difference phase variables $\Phi_{i,i';j,j';cp}(2)$ defined by $$\Phi_{i,i';j,j';cp}(2)=[\beta_{i,j;cp}(2)-\beta_{i',j;cp}(2)]-[\beta_{i,j';cp}(2)-\beta_{i',j';cp}(2)],$$

and phase integer estimates $N_{e;i,i';j,j'}(2)$ given by $$N_{e;i,i';j,j'}(2)=\Delta R_{i,i';j,j';cp}(2)/\lambda_{cp}+\Phi_{i,i';j,j';cp}(2);\text{ and}$$

(10) for determining the desired phase integers for the reference and roving receiver antennas by the relations $$N_{i,i';j,j'}=\text{floor}[(N_{e;i,i';j,j'}(1)+N_{e;i,i';j,j'}(2))/2 +0.5].$$

17. The apparatus of claim 16, wherein said integer n is equal to four.

18. The apparatus of claim 16, wherein said signal processor also solves n − 1 simultaneous equations given by $$\Phi_{i,i';1,2}=-\Delta R_{i,i';1,2}/\lambda_{cp}+N_{i,i';1,2}, (i \text{ and } i'=1,2,\ldots, n; i \neq i')$$

to obtain position coordinates ($x_2,y_2,z_2$) of a roving receiver antenna located at an arbitrary position, when the coordinates ($x_1,y_1,z_1$) of the reference receiver antenna are known with sufficient accuracy.

19. The apparatus of claim 16, wherein said effective frequency, and said corresponding effective phases $\beta_{i,i';j,j';cp}$, is drawn from the group consisting of the L1 carrier frequency $f_{L1}$, the L2 carrier frequency $f_{L2}$, the wide lane frequency $f_w=f_{L1}-f_{L2}$, and the narrow lane frequency $f_n=f_{L1}+f_{L2}$.

20. Apparatus for determining and removing the phase integer ambiguities associated with determination of position of a receiver that is part of a Satellite Positioning System (SPS), the apparatus comprising:

a reference receiver and associated antenna for receiving SPS signals from a plurality of n satellites ($n \geq 4$), numbered $i=1, 2, \ldots, n$, that are part of the SPS, where the position of the reference receiver antenna is known with sufficient accuracy;

a roving receiver and associated antenna for receiving SPS signals from the plurality of n satellites that are part of the SPS, where each satellite transmits a predetermined signal at a predetermined sequence of times at each of at least two carrier signal frequencies $f_{L1}=c/\lambda_{L1}$ and $fL2=c/\lambda_{L2}$, where c is the velocity of light;

antenna positioning means for positioning the roving receiver antenna at a selected position spaced apart from the reference receiver antenna position by a distance d that is less than $\lambda_{cp}/2$, where d need not be otherwise determined and $\lambda_{cp}$ is an effective wavelength defined below;

signal processing means, connected to the reference receiver antenna and to the roving receiver antenna:

(1) for determining a frequency $f_{cp}=\alpha_1 f_{L1}+\alpha_2 f_{L2}=c/\lambda_{cp}$, expressed as a selected linear combination of the two carrier frequencies $f_{L1}$ and $f_{L2}$, for the Satellite Positioning System, where $\lambda_{cp}$ is the corresponding effective wavelength;

(2) for receiving the SPS signals received by the reference receiver antenna and by the roving receiver antenna at a selected position;

(3) for determining a plurality of n theoretical distance values $R_{1,1}, R_{2,1}, \ldots, R_{n,1}$ from each of the n satellites to the roving receiver antenna at the sequence of predetermined times, where $R_{I,J}$ is the distance between satellite number I, with Cartesian coordinates ($x_I,y_I,z_I$), and receiver antenna number J, with coordinates ($x_J,y_J,z_J$) ($I=1, 2, \ldots, n; J=1, 2$), given by $R_{I,J}=[(x_I−x_J)^2+(y_I−y_J)^2+(z_I−z_J)^2]^{\frac{1}{2}}$, where each theoretical distance value is determined from a knowledge of the position of a satellite and of an estimate of a position of the roving receiver antenna, assuming that $d \approx 0$ for this determination;

(4) for determining a plurality of n theoretical distance values $R_{1,2}, R_{2,2}, \ldots, R_{n,2}$ from each of the satellites to the reference receiver antenna at the sequence of predetermined times, where each theoretical distance value is determined from a knowledge of the position of a satellite and of the position of the reference receiver antenna, where the position of the reference receiver antenna is known with sufficient accuracy at each of the predetermined sequence of times;

(5) for forming theoretical range double difference values $\Delta R_{i,i';j,j'}$ ($i,i'=1,2, \ldots, n$; $i \neq i'$; $j,j'=1,2$; $j \neq j'$) for the reference and roving receiver antenna positions, defined by the relations $$\Delta R_{i,i';j,j'} = (R_{i,j} - R_{i',j}) - (R_{i,j'} - R_{i',j'}) \qquad 10$$

for the pair of satellites number i and i' and the pair of receiver antennas number j and j';

(6) for measuring the effective phase $\beta_{ij;cp}$ from satellite number i of a carrier signal with effective frequency $f=f_{cp}$ received at receiver antenna number j ($i=1,2, \ldots, n$; $j=1, 2$);

(7) for forming double difference phase variables $$\Phi_{i,i';j,j';cp} = [\beta_{i,j;cp} - \beta_{i',j;cp}] - [\beta_{i,j';cp} 1728 \, \beta_{i',j';cp}]$$

for the satellites number i and i' and the receiver antennas number j and j', using the signal frequency $f=f_{cp}$;

(8) for determining phase integer estimates $N_{e;i,i';j,j'}$ by the relations $$N_{e;i,i';j,j'} = \Delta R_{i,i';j,j'}/\lambda_{cp} + \Phi_{i,i';j,j';cp}; \text{ and}$$

(9) for determining the desired phase integers for the reference and roving receiver antennas by the relations $$N_{i,i';j,j'} = \text{floor}[N_{e;i,i';j,j'} + 0.5].$$

21. The apparatus of claim 20, wherein said integer n is equal to four.

22. The apparatus of claim 20, wherein said signal processor also solves $n-1$ simultaneous equations given by $$\Phi_{i,i';1,2} = -\Delta R_{i,i';1,2}/\lambda_{cp} + N_{i,i';1,2}, (i \text{ and } i'=1,2,\ldots, n; i \neq i')$$

to obtain position coordinates ($x_2,y_2,z_2$) of a roving receiver antenna located at an arbitrary position, when the coordinates ($x_1,y_1,z_1$) of the reference receiver antenna are known with sufficient accuracy.

23. The apparatus of claim 20, wherein said effective frequency, and said corresponding effective phases $\beta_{i,i';j,j';cp}$, is drawn from the group consisting of the L1 carrier frequency $f_{L1}$, the L2 carrier frequency $f_{L2}$, the wide lane frequency $f_w = f_{L1} - f_{L2}$, and the narrow lane frequency $f_n = f_{L1} + f_{L2}$.

24. Apparatus for determining and removing the phase integer ambiguities associated with determination of position of a receiver that is part of a Satellite Positioning System (SPS), the apparatus comprising:

a reference receiver, denoted receiver number 1, and associated antenna for receiving SPS signals from a plurality of n satellites ($n \geq 4$), numbered $i=1, 2, \ldots, n$, that are part of the SPS, where the position of the reference receiver antenna is known with sufficient accuracy;

a roving receiver, denoted receiver number 2, and associated antenna for receiving SPS signals from the plurality of n satellites that are part of the SPS, where each satellite transmits a predetermined signal at a predetermined sequence of times at each of at least two carrier signal frequencies $f_{L1} = c/\lambda_{L1}$ and $f_{L2} = c/\lambda_{L2}$, where c is the velocity of light, where the roving receiver antenna position $r(\text{rov}, d, L)$ is displaced from the reference receiver antenna position by a known distance d in a first direction along a selected line L containing the reference receiver antenna position;

antenna positioning means for positioning the roving receiver antenna at a selected position spaced apart from the reference receiver antenna position by a selected distance d along the line L, where the line L makes a known azimuthal angle $\Psi$ with respect to a chosen north direction;

signal processing means, connected to the reference receiver antenna and to the roving receiver antenna:

(1) for determining, from the known geodetic coordinates (latitude$_1$, longitude$_1$, altitude$_1$) of the reference receiver antenna position, the geodetic coordinates of the roving receiver antenna (latitude$_2$, longitude$_2$, altitude$_2$) according to the relations latitude$_2$ = latitude$_1$ + (360° d cos $\Psi$)/($2\pi R$), longitude$_2$ = longitude$_1$ + (360° d sin $\Psi$)/($2\pi R$ cos(latitude$_1$)), altitude$_2$ = altitude $_1$;

(2) for determining an effective frequency $f_{cp} = \alpha_1 f_{L1} + \alpha_2 f_{L2} = c/\lambda_{cp}$, expressed as a selected linear combination of the two carrier frequencies $f_{L1} = c/\lambda_{L1}$ and $f_{L2} = c/\lambda_{L2}$, for the Satellite Positioning System, where c is the velocity of light and $\lambda_{cp}$ is the corresponding effective wavelength;

(3) for determining a plurality of n theoretical distance values $R_{1,2}, R_{2,2}, \ldots, R_{n,2}$ from each of the satellites to the reference receiver antenna at the sequence of predetermined times, where each theoretical distance value is determined from a knowledge of the position of a satellite and of the position of the reference receiver antenna, where the position of the reference receiver antenna is known with sufficient accuracy at each of the predetermined sequence of times;

(4) for determining a plurality of n theoretical distance values $R_{1,1}, R_{2,1}, \ldots, R_{n,1}$ from each of the n satellites to the roving receiver antenna at the sequence of predetermined times, using the geodetic coordinates for this antenna determined in step (1), where $R_{I,J}$ is the distance between satellite number I, with Cartesian coordinates ($x_I,y_I,z_I$), and receiver antenna number J, with coordinates ($x_J,y_J,z_J$) ($I=1, 2, \ldots, n$; $J=1, 2$), given by $R_{I,J} = [(x_I - x_J)^2 + (y_I - y_J)^2 + (z_I - z_J)^2]^{\frac{1}{2}}$;

(5) for forming theoretical range double difference values $\Delta R_{i,i';j,j'}(1)$ ($i,i'=1,2, \ldots, n$; $i \neq i'$; $j,j'=1,2$; $j \neq j'$) for the reference and roving receiver antenna positions, defined by the relations $$\Delta R_{i,i';j,j'} = (R_{i,j} - R_{i',j}) - (R_{i,j'} - R_{i',j'})$$

for the pair of satellites number i and i' and the pair of receiver antennas number j and j';

(6) for measuring the effective phase $\beta_{ij;cp}$ from satellite number i of a signal with effective frequency $f=f_{cp}$ received at receiver antenna number $j$ $(i=1,2,\ldots,n; j=1,2)$;

(7) for forming double difference phase variables $$\Phi_{i,i';j,j';cp}=[\beta_{i,j;cp}-\beta_{i',j;cp}]-[\beta_{i,j';cp}-\beta_{i',j';cp}]$$

for the satellites number $i$ and $i'$ and the receiver antennas number $j$ and $j'$, using the effective signal frequency $f=f_{cp}$;

(8) for determining phase integer estimates $N_{e;i,i';j,j'}$ by the relations $$N_{e;i,i';j,j'}=\Delta R_{i,i';j,j'}/\lambda_{cp}+\Phi_{i,i';j,j';cp}; \text{ and}$$

(9) for determining the desired phase integers for the reference and roving receiver antennas by the relations $$N_{i,i';j,j'}=\text{floor}[N_{e;i,i';j,j'}+0.5].$$

25. The apparatus of claim 24, wherein said integer n is equal to four.

26. The apparatus of claim 24, wherein said signal processor also solves $n-1$ simultaneous equations given by $$\Phi_{i,i';1,2}=-\Delta R_{i,i';1,2}/\lambda_{cp}+N_{i,i';1,2}, (i \text{ and } i'=1,2,\ldots, n; i\neq i')$$

to obtain position coordinates $(x_2,y_2,z_2)$ of a roving receiver antenna located at an arbitrary position, when the coordinates $(x_1,y_1,z_1)$ of the reference receiver antenna are known with sufficient accuracy.

27. The apparatus of claim 24, wherein said effective frequency, and said corresponding effective phases $\beta_{i,i';j,j';cp}$, is drawn from the group consisting of the L1 carrier frequency $f_{L1}$, the L2 carrier frequency $f_{L2}$, the wide lane frequency $f_w=f_{L1}-f_{L2}$, and the narrow lane frequency $f_n=f_{L1}+f_{L2}$.

* * * * *